United States Patent
Koreeda et al.

(10) Patent No.: US 8,941,925 B2
(45) Date of Patent: Jan. 27, 2015

(54) ZOOM LENS SYSTEM

(71) Applicant: Hoya Corporation, Tokyo (JP)

(72) Inventors: Daisuke Koreeda, Saitama (JP); Toshiki Nakamura, Tokyo (JP)

(73) Assignee: Hoya Corporation, Tokyo (JP)

( * ) Notice: Subject to any disclaimer, the term of this patent is extended or adjusted under 35 U.S.C. 154(b) by 47 days.

(21) Appl. No.: 13/854,378

(22) Filed: Apr. 1, 2013

(65) Prior Publication Data

US 2013/0279018 A1    Oct. 24, 2013

(30) Foreign Application Priority Data

Apr. 19, 2012 (JP) ................. 2012-095964

(51) Int. Cl.
*G02B 15/14* (2006.01)
*G02B 15/173* (2006.01)

(52) U.S. Cl.
CPC .............. *G02B 15/14* (2013.01); *G02B 15/173* (2013.01)
USPC .......................................... 359/676; 359/684

(58) Field of Classification Search
CPC ........ G02B 15/15; G02B 15/16; G02B 15/20; G02B 15/173
USPC ................... 359/676, 677, 683–685
See application file for complete search history.

(56) References Cited

U.S. PATENT DOCUMENTS

| | | | |
|---|---|---|---|
| 2011/0019033 A1 | 1/2011 | Ori et al. | |
| 2011/0085248 A1* | 4/2011 | Ohtake et al. | 359/683 |
| 2011/0261250 A1 | 10/2011 | Touchi et al. | |
| 2011/0292253 A1 | 12/2011 | Nishio | |
| 2012/0293872 A1* | 11/2012 | Katayose et al. | 359/684 |
| 2013/0208364 A1* | 8/2013 | Ito | 359/690 |

FOREIGN PATENT DOCUMENTS

| | | |
|---|---|---|
| JP | 2011-186417 | 9/2011 |
| JP | 2011-232543 | 11/2011 |
| JP | 2011-252962 | 12/2011 |

* cited by examiner

*Primary Examiner* — Darryl J Collins
(74) *Attorney, Agent, or Firm* — Greenblum & Bernstein, P.L.C.

(57) ABSTRACT

A zoom lens system includes a positive first lens group, a negative second lens group, a positive third lens group, a negative fourth lens group, and a positive fifth lens group. Upon zooming from the short to long focal length extremities, the distance between the first and second lens groups increases, and the distance between the second and third lens groups decreases. The following conditions are satisfied:

$$0.30 < f1/ft < 0.43, \text{ and}$$

$$7.0 < M2t/M2w < 17.0.$$

f1 designates the focal length of the first lens group, ft designates the focal length of the zoom lens system at the long focal length extremity, and M2w and M2t designate the lateral magnifications of the second lens group when focusing on an object at infinity at the short and long focal length extremities, respectively.

14 Claims, 19 Drawing Sheets

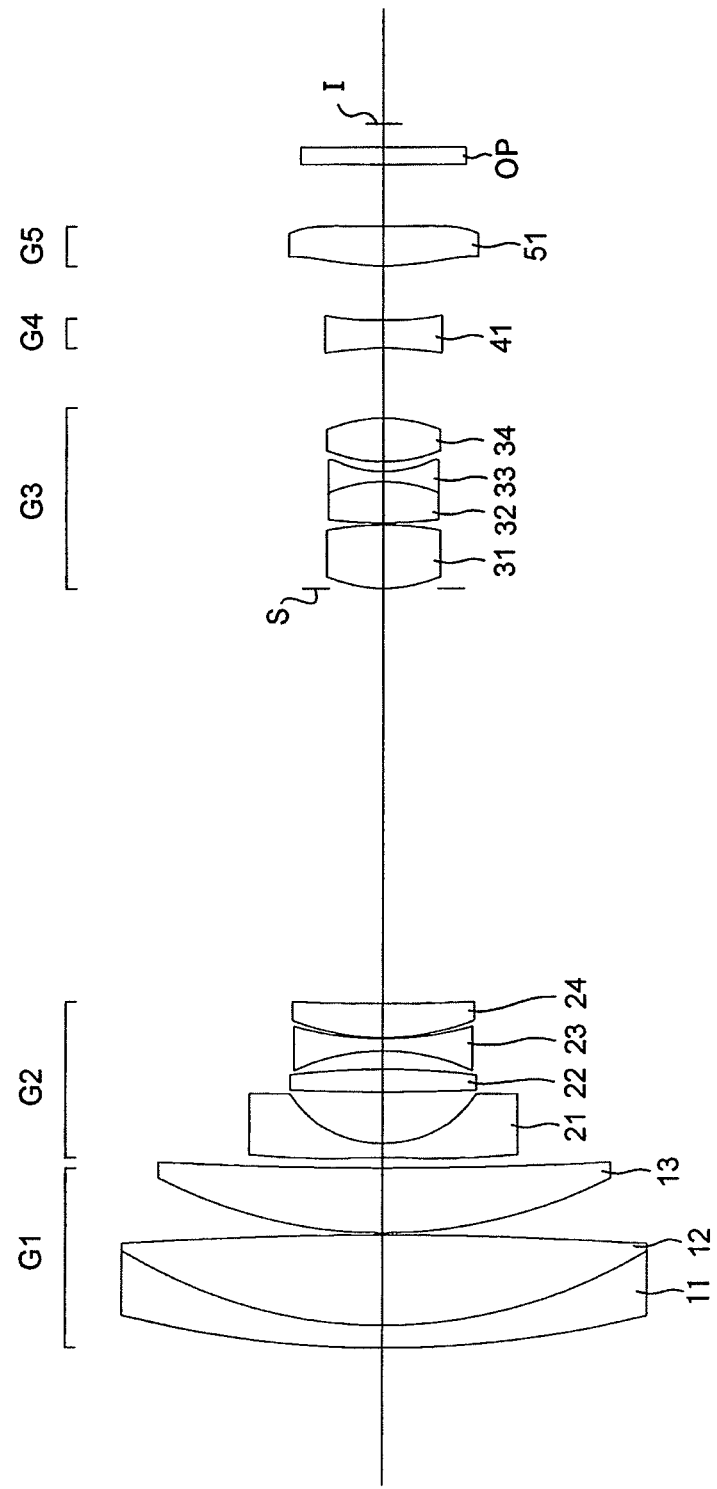

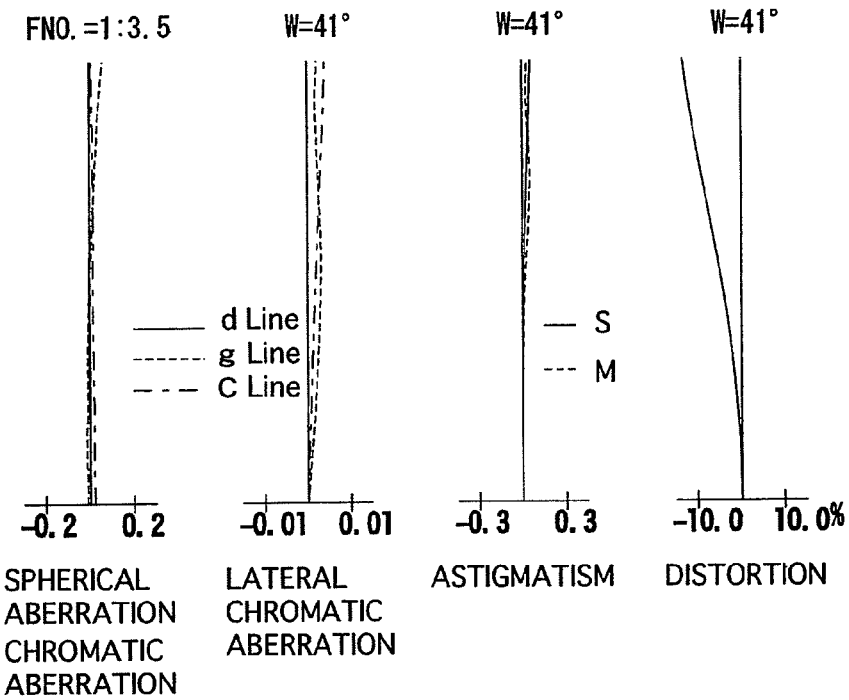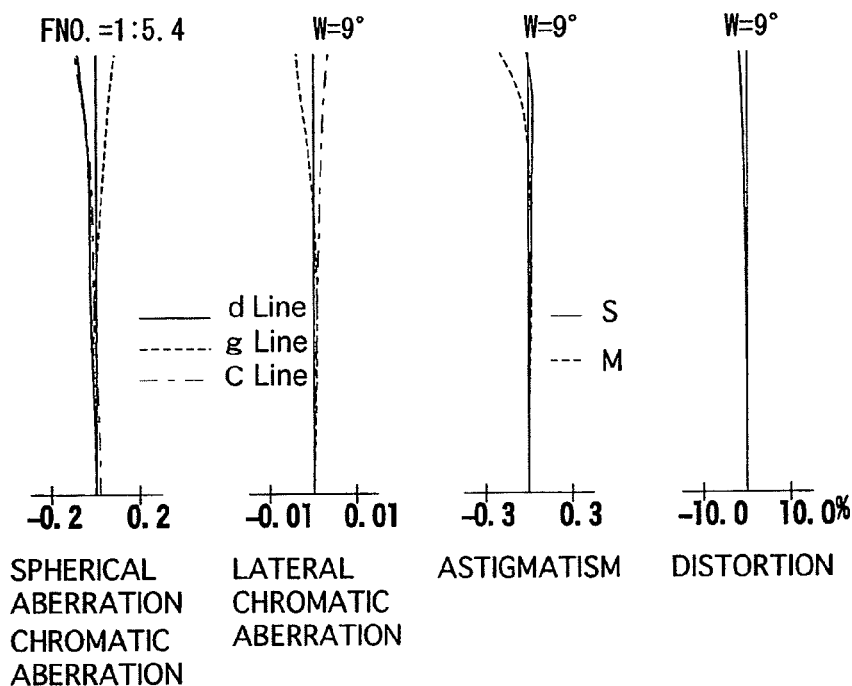

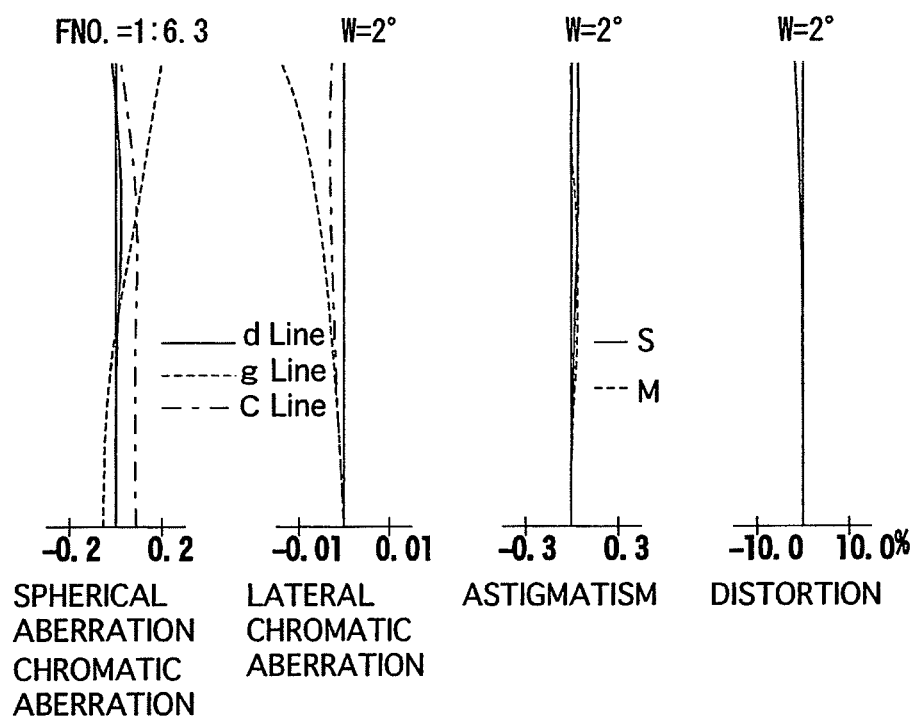

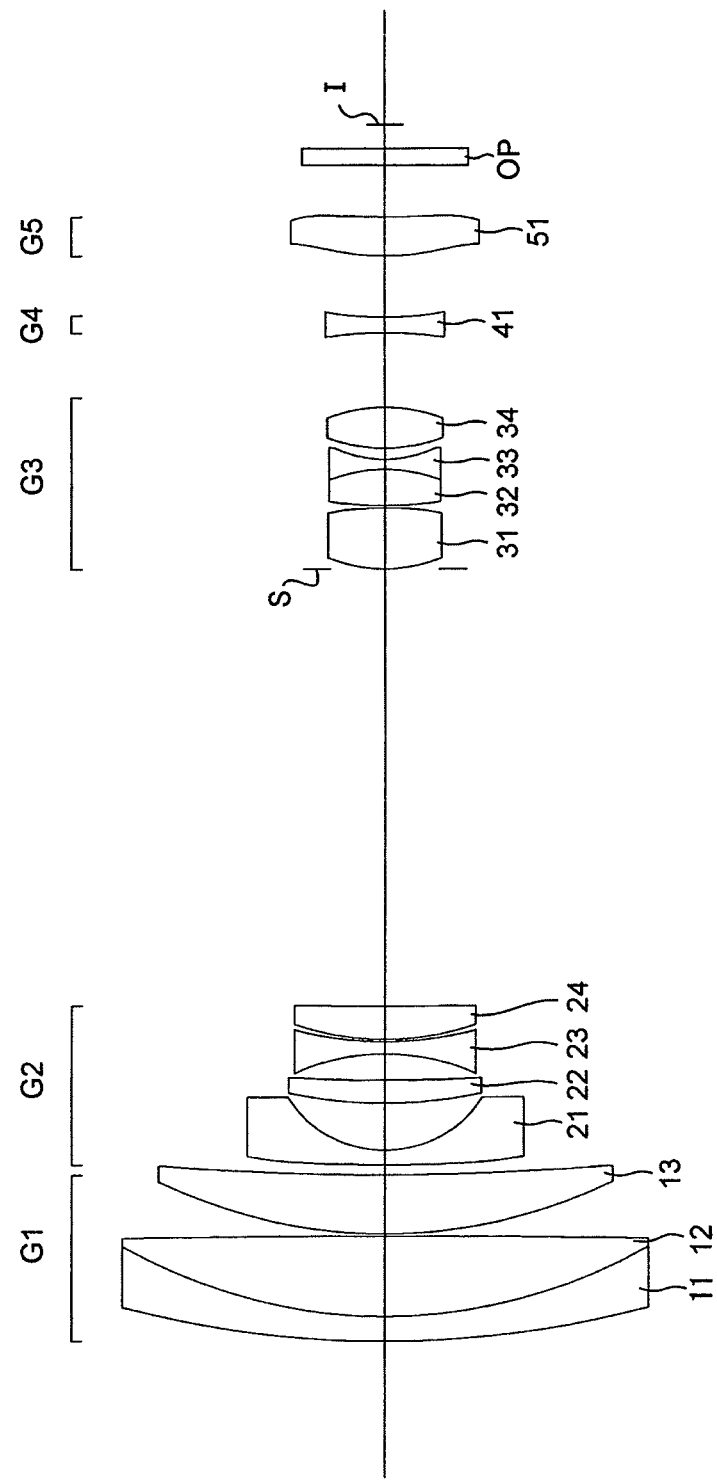

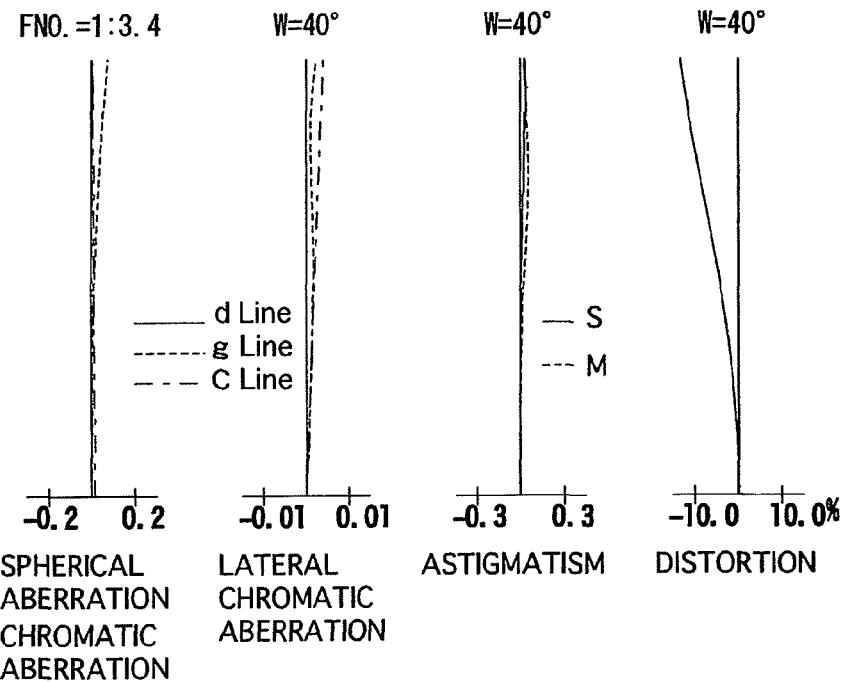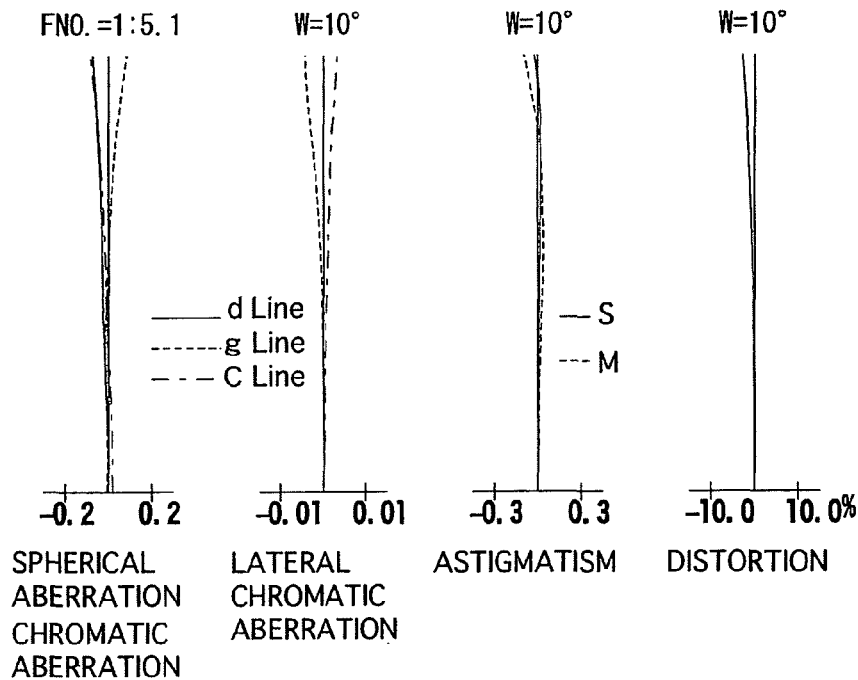

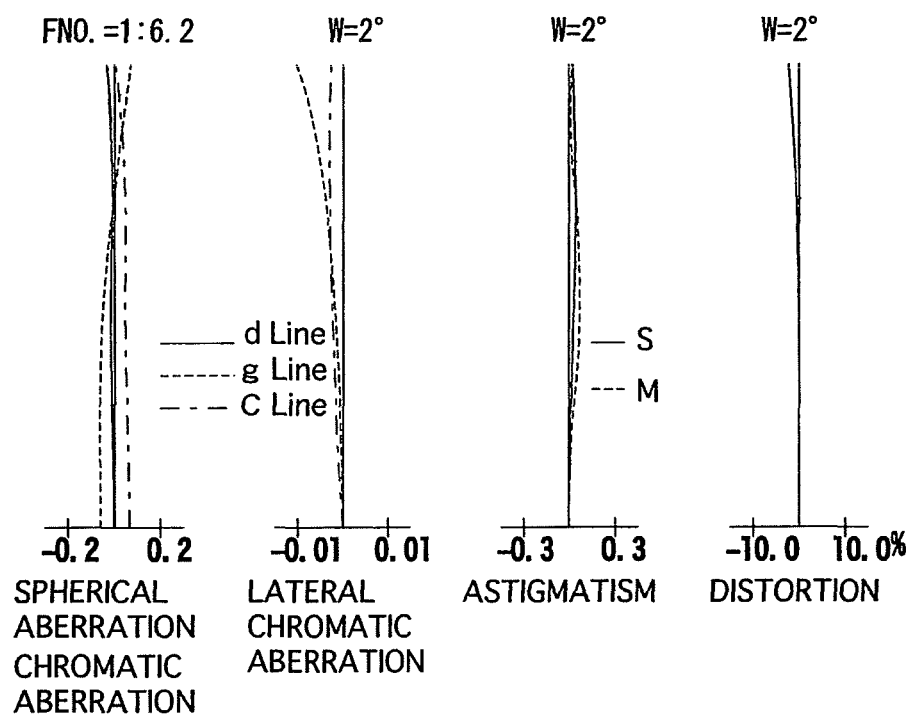

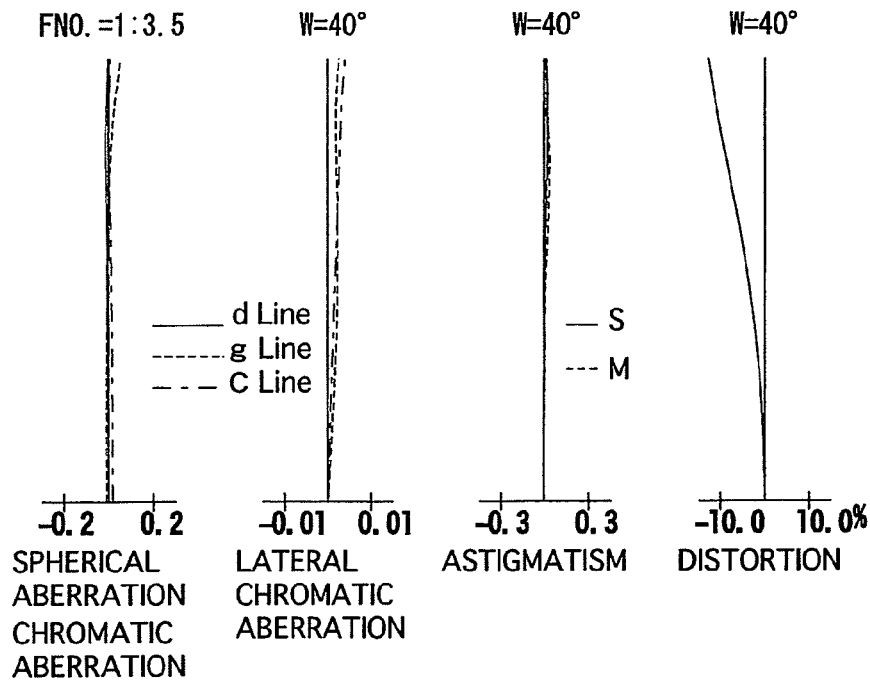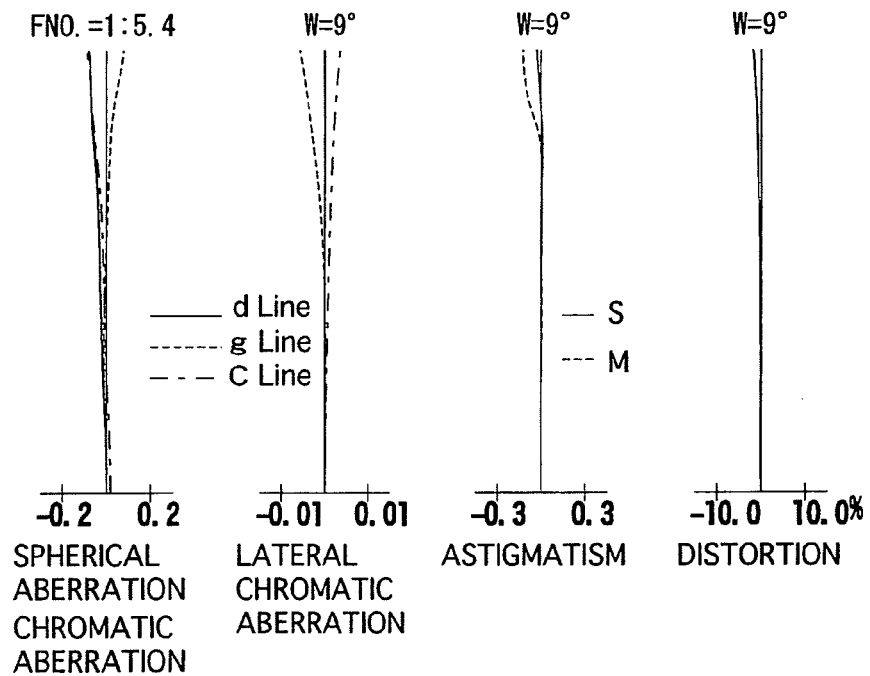

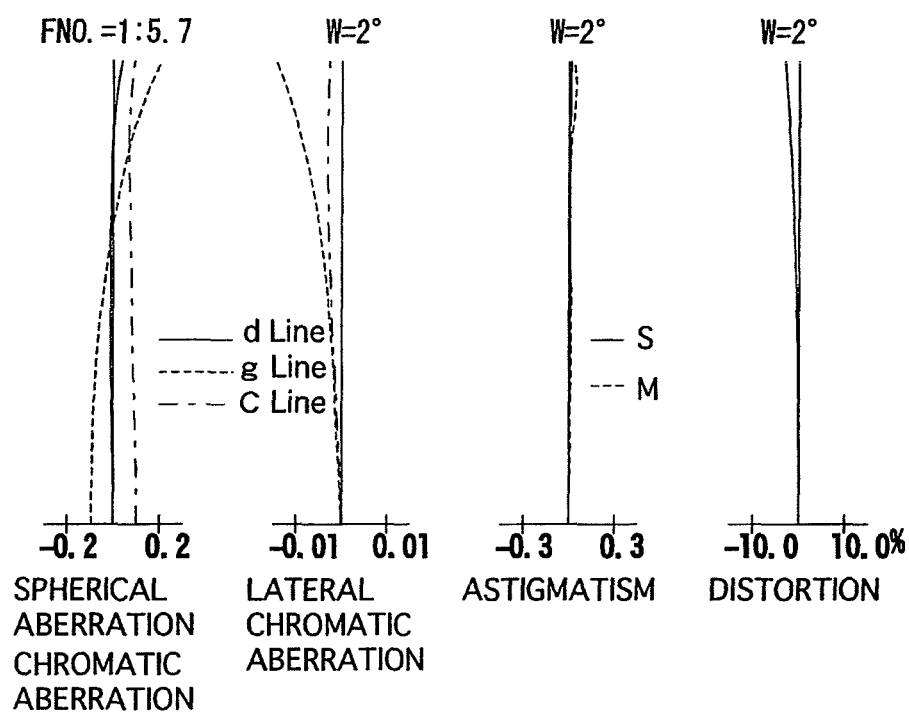

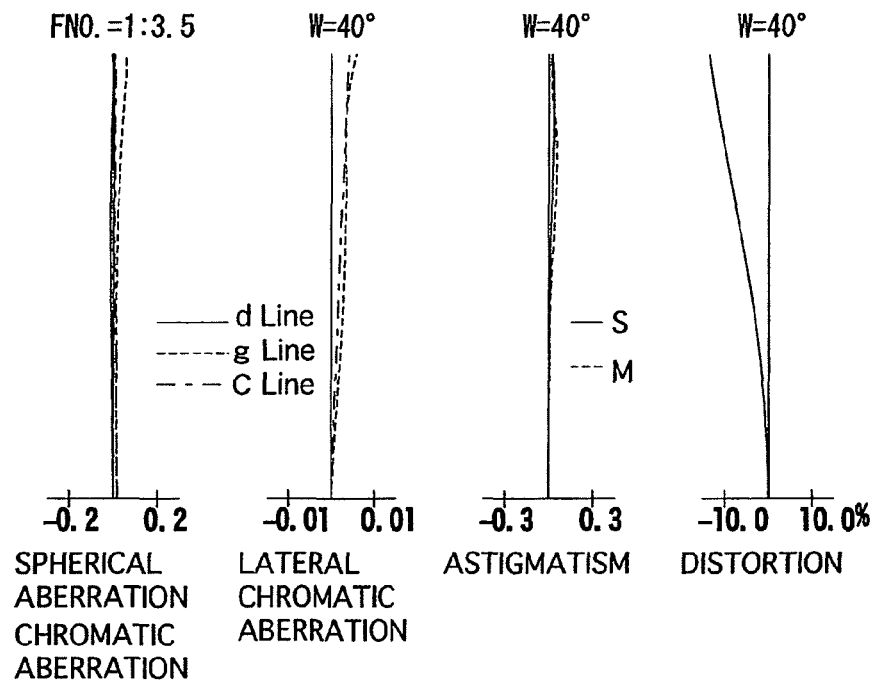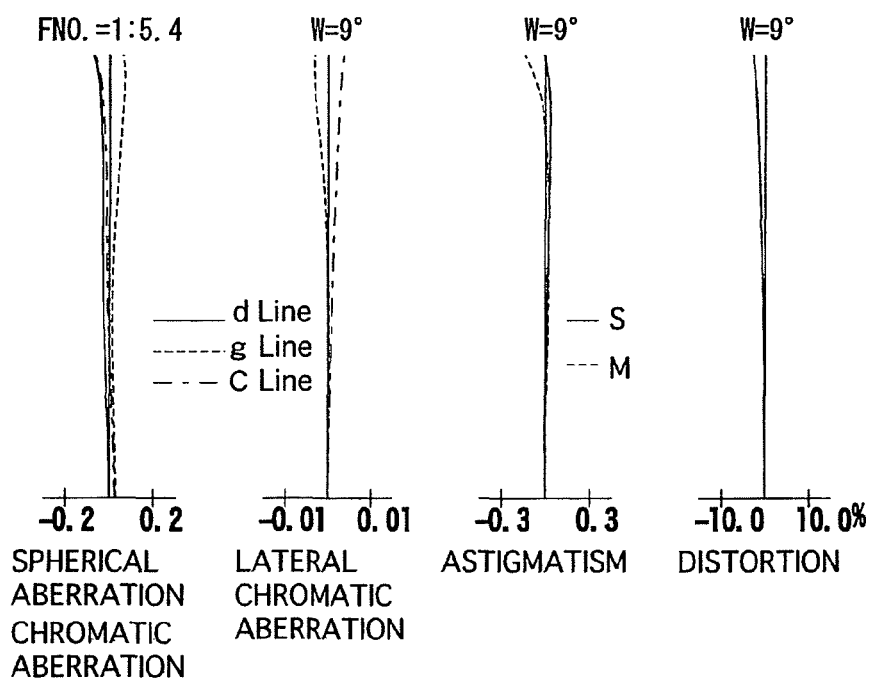

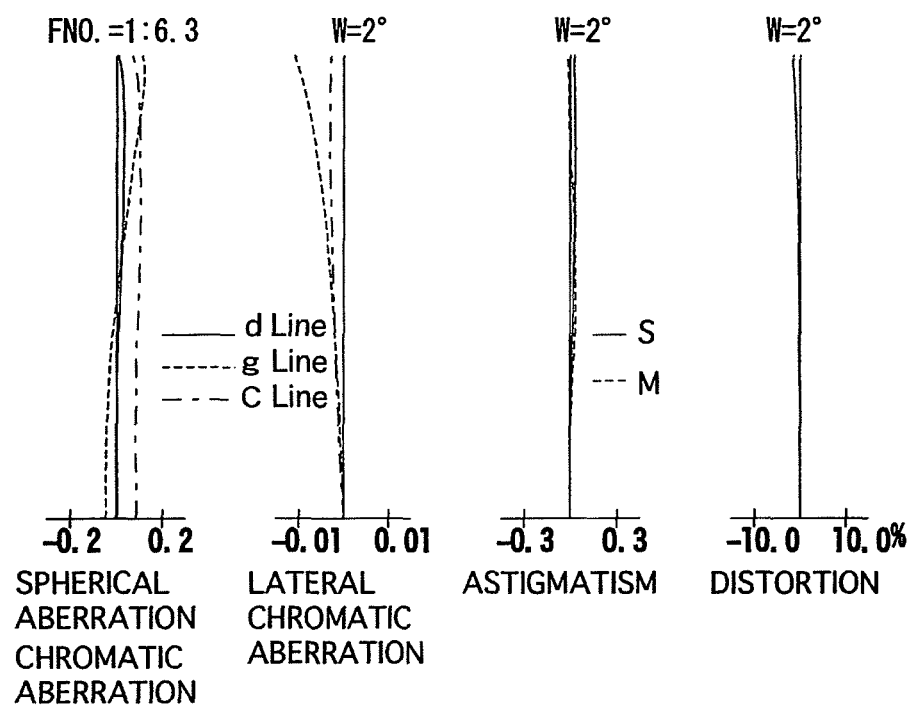

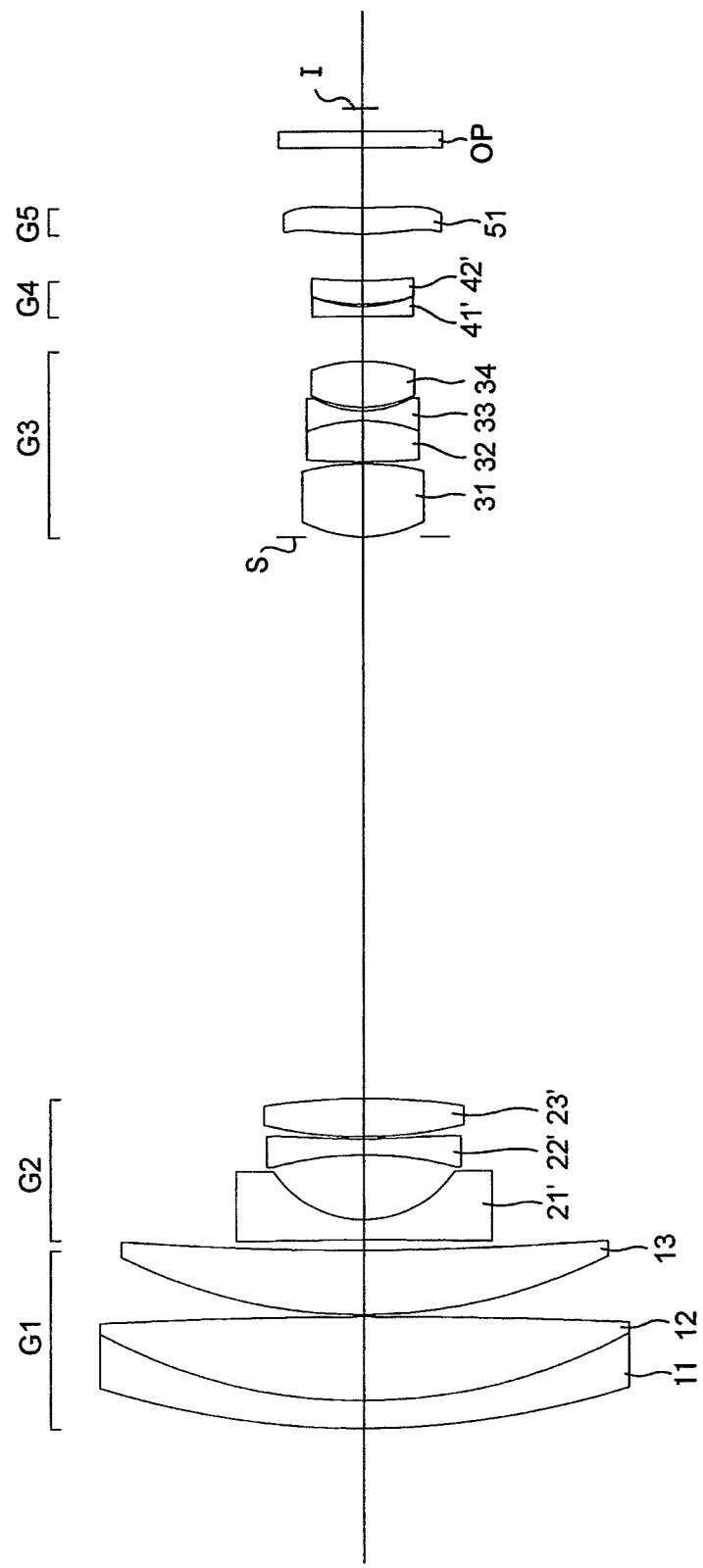

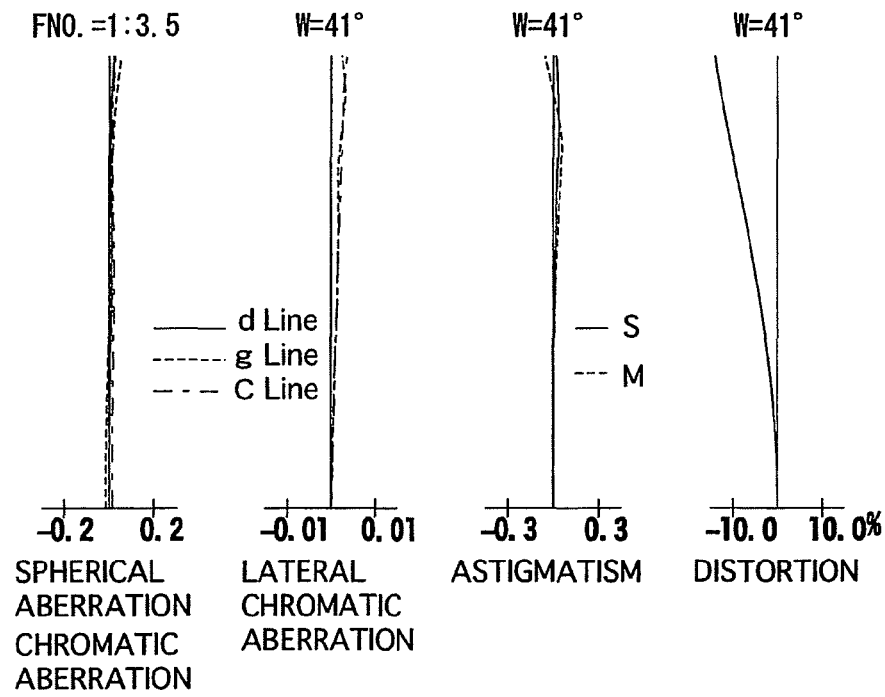
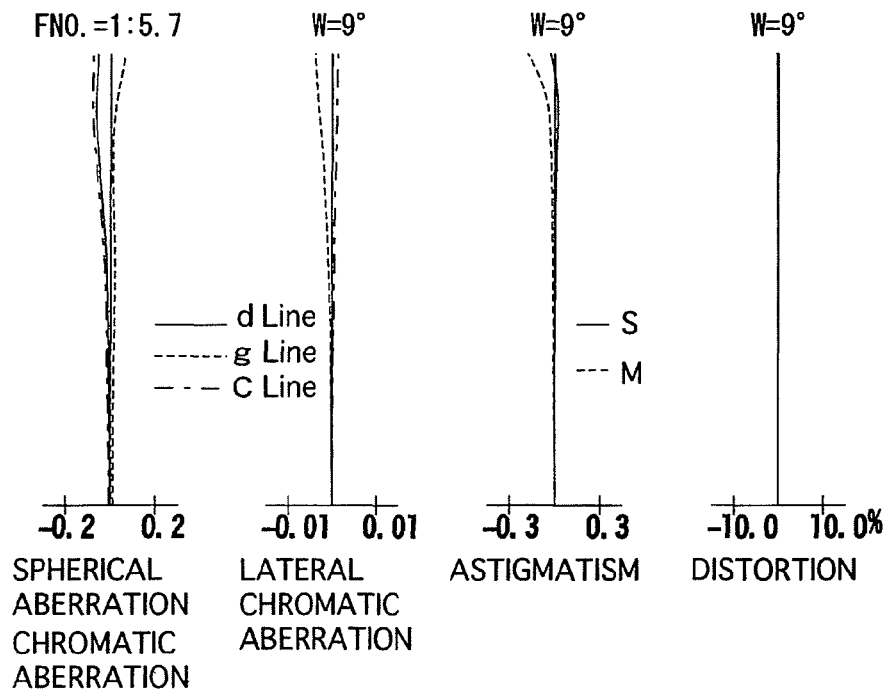

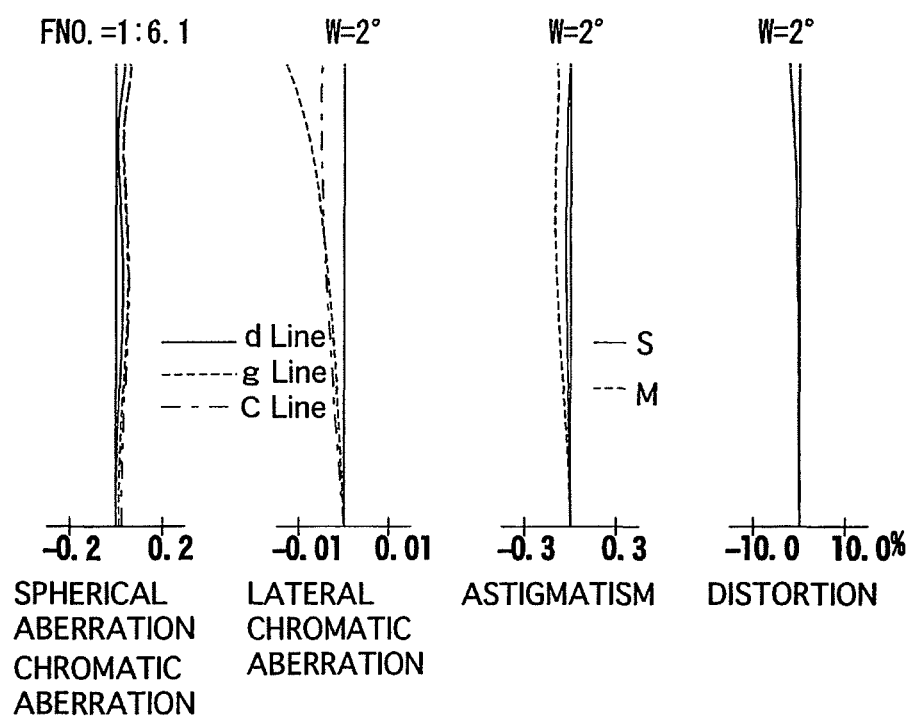

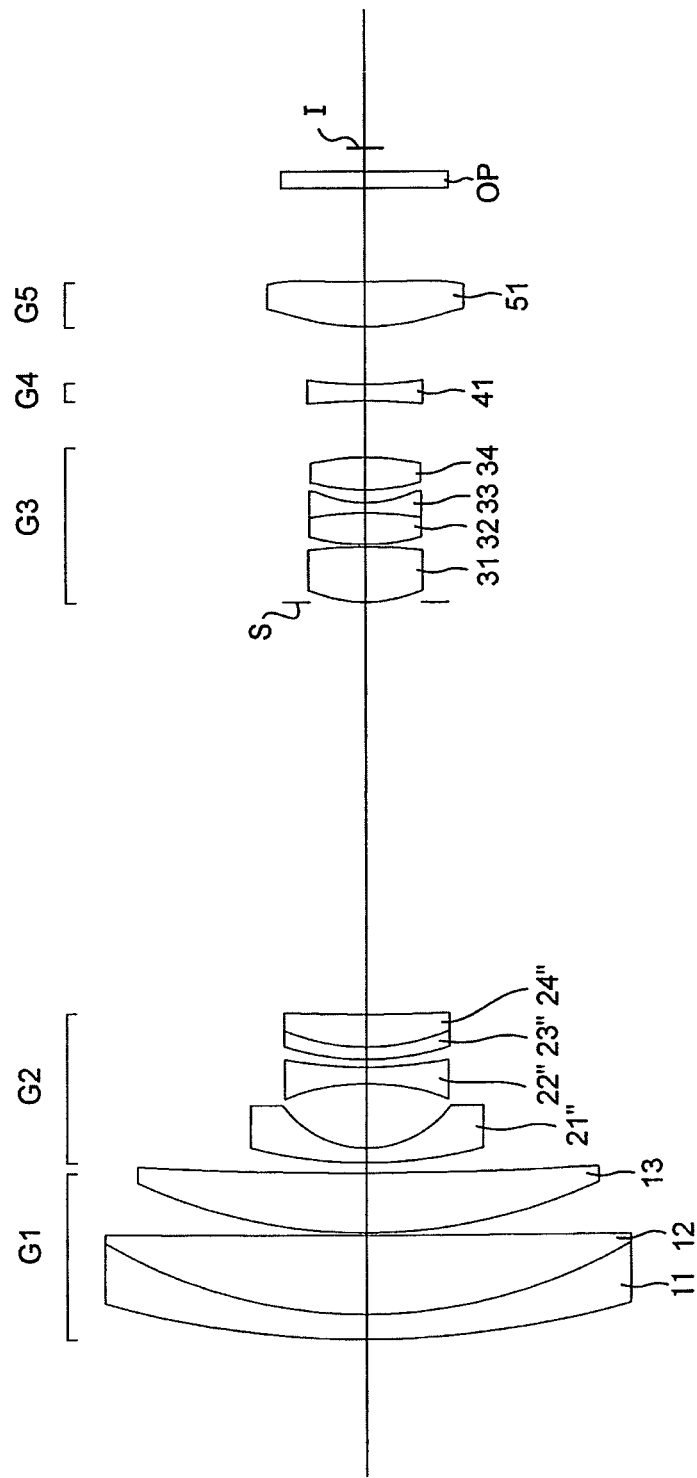

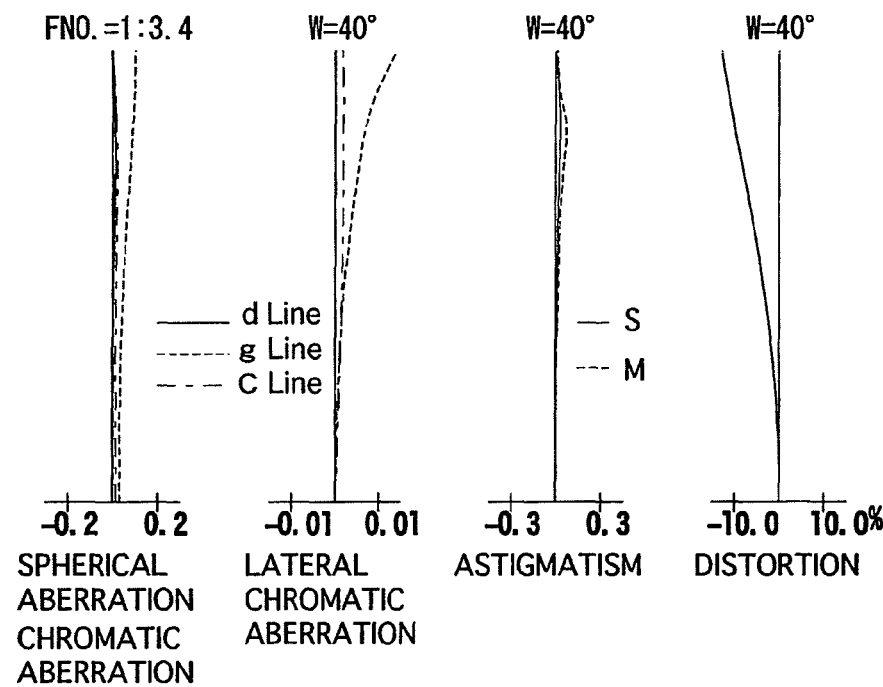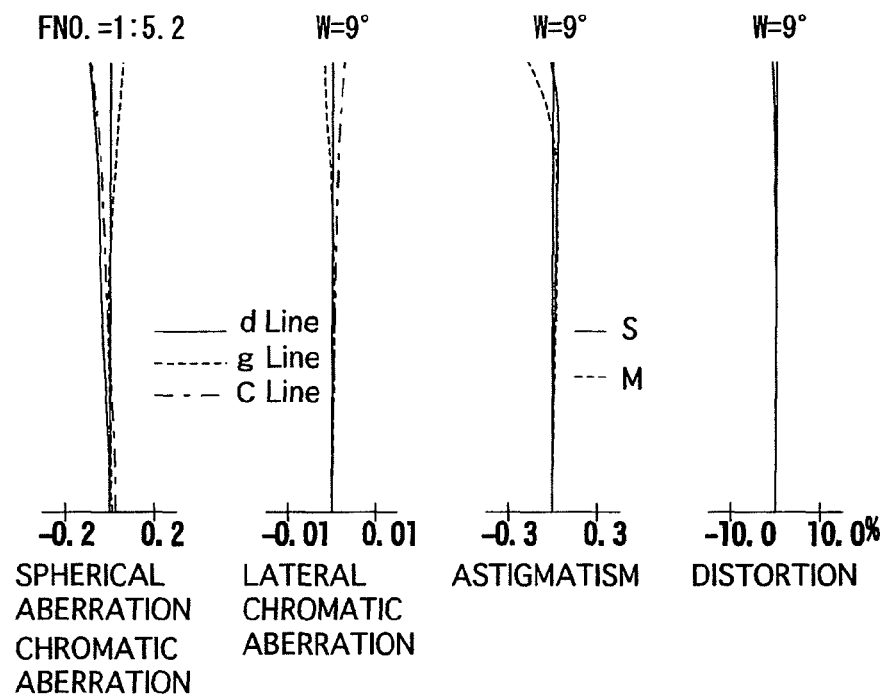

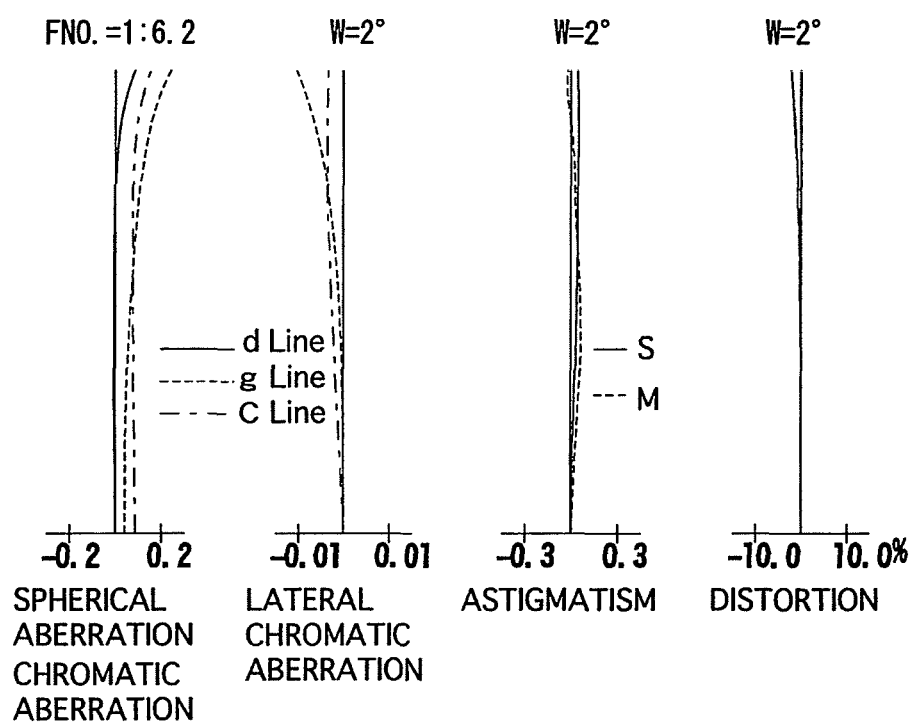

ZOOM LENS SYSTEM

BACKGROUND OF THE INVENTION

1. Field of the Invention

The present invention relates to a zoom lens system.

2. Description of Related Art

Japanese Unexamined Patent Publication Nos. 2011-186417, 2011-232543 and 2011-252962 each disclose a zoom lens system configured of a positive first lens group, a negative second lens group, a positive third lens group, a negative fourth lens group, and a positive fifth lens group, in that order from the object side.

The zoom lens system in Japanese Unexamined Patent Publication No. 2011-186417 has a zoom ratio of 16:1 through 18:1, which is either a zoom ratio that is not sufficiently high or the telephoto ratio (the ratio of the focal length at the long focal length extremity to the entire length of the zoom lens system at the long focal length extremity) is approximately 1.0, so that miniaturization of the zoom lens system (reduction of the overall length of the zoom lens system in the optical axis direction) is insufficient. Furthermore, the zoom lens system disclosed in Japanese Unexamined Patent Publication No. 2011-232543 has a zoom ratio of a range of 10:1 through 15:1 and the zoom lens system disclosed in Japanese Unexamined Patent Publication No. 2011-252962 has a zoom ratio of a range of 15:1 through 20:1, which are both insufficient for achieving a high zoom ratio.

SUMMARY OF THE INVENTION

The present invention has been devised in consideration of the above-mentioned problems, and provides a zoom lens system which can achieve a high zoom ratio of 25:1 through 30:1 and achieve miniaturization (reduction in the overall length of the zoom lens system in the optical axis direction) in which the telephoto ratio is approximately 0.7.

According to an aspect of the present invention, a zoom lens system is provided, including a positive first lens group, a negative second lens group, a positive third lens group, a negative fourth lens group, and a positive fifth lens group, in that order from the object side, wherein upon zooming from the short focal length extremity to the long focal length extremity, the distance between the first lens group and the second lens group increases, and the distance between the second lens group and the third lens group decreases. The following conditions (1) and (2) are satisfied:

$$0.30 < f1/ft < 0.43 \quad (1), \text{ and}$$

$$7.0 < M2t/M2w < 17.0 \quad (2),$$

wherein f1 designates the focal length of the first lens group, ft designates the focal length of the entire zoom lens system at the long focal length extremity, M2w designates the lateral magnification of the second lens group when focusing on an object at infinity at the short focal length extremity, and M2t designates the lateral magnification of the second lens group when focusing on an object at infinity at the long focal length extremity.

It is desirable for the second lens group to include a negative lens element having a concave surface on the image side, a positive lens element, a negative lens element, and a positive lens element, in that order from the object side, and for the following condition (3) to be satisfied:

$$20 < (v22+v24)/2 < 35 \quad (3),$$

wherein v22 designates the Abbe number with respect to the d-line of the positive lens element that is provided on the object side within the second lens group, and v24 designates the Abbe number with respect to the d-line of the positive lens element that is provided on the image side within the second lens group.

It is desirable for the second lens group to include a negative lens element having a concave surface on the image side, a negative lens element, and a positive lens element, in that order from the object side, and for the following condition (3') to be satisfied:

$$20 < v23' < 35 \quad (3'),$$

wherein v23' designates an Abbe number with respect to the d-line of the positive lens element provided within the second lens group.

It is desirable for the second lens group to include a negative lens element having a concave surface on the image side, a negative lens element, a negative lens element, and a positive lens element, in that order from the object side, and for the following condition (3") to be satisfied:

$$20 < v24'' < 35 \quad (3''),$$

wherein v24" designates the Abbe number with respect to the d-line of the positive lens element provided within the second lens group.

It is desirable for the first lens group to include a negative lens element, a positive lens element, and a positive lens element, in that order from the object side.

It is desirable for the following condition (4) to be satisfied:

$$(v12+v13)/2 > 75 \quad (4),$$

wherein v12 designates the Abbe number with respect to the d-line of the positive lens element that is provided on the object side within the first lens group, and v13 designates the Abbe number with respect to the d-line of the positive lens element that is provided on the image side within the first lens group.

It is desirable for the following condition (5) to be satisfied:

$$30 < v11 < 45 \quad (5),$$

wherein v11 designates the Abbe number with respect to the d-line of the negative lens element provided within the first lens group.

Out of the range specified by condition (5) of the zoom lens system according to the present invention, it is desirable for the following condition (5') to be satisfied:

$$35 < v11 < 45 \quad (5').$$

It is desirable for the negative lens element and the positive lens element on the object side, which are provided within the first lens group, to be bonded to each other to form a cemented lens.

It is desirable for the following condition (6) to be satisfied:

$$1.3 < M4m/M4w < 1.8 \quad (6),$$

wherein M4m designates the lateral magnification of the fourth lens group when focusing on an object at infinity at an intermediate focal length fm, wherein $fm=(fw*ft)^{1/2}$, wherein fw designates the focal length of the entire zoom lens system at the short focal length extremity, and ft designates the focal length of the entire zoom lens system at the long focal length extremity, and M4w designates the lateral magnification of the fourth lens group when focusing on an object at infinity at the short focal length extremity.

It is desirable for the following conditions (7) and (8) to be satisfied:

$$-12.0 < f2/((D23w-D23t)/(ft/fw)) < -7.7 \quad (7),$$

and $$12.2 < f3/((D23w-D23t)/(ft/fw)) < 16.0 \quad (8),$$

wherein f2 designates the focal length of the second lens group, f3 designates the focal length of the third lens group, D23w designates the air-distance between the second lens group and the third lens group at the short focal length extremity, D23t designates the air-distance between the second lens group and the third lens group at the long focal length extremity, ft designates the focal length of the entire zoom lens system at the long focal length extremity, and fw designates the focal length of the entire zoom lens system at the short focal length extremity.

It is desirable for the third lens group to include a positive lens element, a cemented lens formed by a positive lens element and a negative lens element; and a positive lens element, in that order from the object side, and for the following condition (9) to be satisfied:

$$1.52 < (n31+n32+n34)/3 < 1.60 \quad (9),$$

wherein n31 designates the refractive index at the d-line of the positive lens element provided closest to the object side within the third lens group, n32 designates the refractive index at the d-line of the positive lens element provided second closest to the object side within the third lens group, and n34 designates the refractive index at the d-line of the positive lens element provided closest to the image side within the third lens group.

It is desirable for the fourth lens group and the fifth lens group to both serve as a focusing lens group that is moved in the optical axis direction during a focusing operation in at least one part of the zooming range of the zoom lens system.

It is desirable for the fourth lens group to be a negative single lens element.

Alternatively, it is desirable for the fourth lens group to include a negative lens element and a positive lens element, in that order from the object side.

It is desirable for the fifth lens group to be a positive single lens element.

According to the present invention, a zoom lens system is obtained which can achieve a high zoom ratio of 25:1 through 30:1, and achieve miniaturization (reduction in the overall length of the zoom lens system in the optical axis direction) in which the telephoto ratio is approximately 0.7.

The present disclosure relates to subject matter contained in Japanese Patent Application No. 2012-095964 (filed on Apr. 19, 2012) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment of a zoom lens system, according to the present invention, at the short focal length extremity when focused on an object at infinity;

FIGS. 2A, 2B, 2C and 2D show various aberrations that occurred in the lens arrangement shown in FIG. 1, at the short focal length extremity when focused on an object at infinity;

FIGS. 3A, 3B, 3C and 3D show various aberrations that occurred in the lens arrangement shown in FIG. 1, at an intermediate focal length when focused on an object at infinity;

FIGS. 4A, 4B, 4C and 4D show various aberrations that occurred in the lens arrangement shown in FIG. 1, at the long focal length when focused on an object at infinity;

FIG. 5 shows a lens arrangement of a second numerical embodiment of a zoom lens system, according to the present invention, at the short focal length extremity when focused on an object at infinity;

FIGS. 6A, 6B, 6C and 6D show various aberrations that occurred in the lens arrangement shown in FIG. 5, at the short focal length extremity when focused on an object at infinity;

FIGS. 7A, 7B, 7C and 7D show various aberrations that occurred in the lens arrangement shown in FIG. 5, at an intermediate focal length when focused on an object at infinity;

FIGS. 8A, 8B, 8C and 8D show various aberrations that occurred in the lens arrangement shown in FIG. 5, at the long focal length when focused on an object at infinity;

FIGS. 10A, 10B, 10O and 10D show various aberrations that occurred in the lens arrangement shown in FIG. 9, at the short focal length extremity when focused on an object at infinity;

FIGS. 11A, 11B, 11C and 11D show various aberrations that occurred in the lens arrangement shown in FIG. 9, at an intermediate focal length when focused on an object at infinity;

FIGS. 12A, 12B, 12C and 12D show various aberrations that occurred in the lens arrangement shown in FIG. 9, at the long focal length when focused on an object at infinity;

FIGS. 14A, 14B, 14C and 14D show various aberrations that occurred in the lens arrangement shown in FIG. 13, at the short focal length extremity when focused on an object at infinity;

FIGS. 15A, 15B, 15C and 15D show various aberrations that occurred in the lens arrangement shown in FIG. 13, at an intermediate focal length when focused on an object at infinity;

FIGS. 16A, 16B, 16C and 16D show various aberrations that occurred in the lens arrangement shown in FIG. 13, at the long focal length when focused on an object at infinity;

FIG. 17 shows a lens arrangement of a fifth numerical embodiment of a zoom lens system, according to the present invention, at the short focal length extremity when focused on an object at infinity;

FIGS. 18A, 18B, 18C and 18D show various aberrations that occurred in the lens arrangement shown in FIG. 17, at the short focal length extremity when focused on an object at infinity;

FIGS. 19A, 19B, 19C and 19D show various aberrations that occurred in the lens arrangement shown in FIG. 17, at an intermediate focal length when focused on an object at infinity;

FIGS. 20A, 20B, 20C and 20D show various aberrations that occurred in the lens arrangement shown in FIG. 17, at the long focal length when focused on an object at infinity;

FIG. 21 shows a lens arrangement of a sixth numerical embodiment of a zoom lens system, according to the present invention, at the short focal length extremity when focused on an object at infinity;

FIGS. 22A, 22B, 22C and 22D show various aberrations that occurred in the lens arrangement shown in FIG. 21, at the short focal length extremity when focused on an object at infinity;

FIGS. 23A, 23B, 23C and 23D show various aberrations that occurred in the lens arrangement shown in FIG. 21, at an intermediate focal length when focused on an object at infinity;

FIGS. 24A, 24B, 24C and 24D show various aberrations that occurred in the lens arrangement shown in FIG. 21, at the long focal length when focused on an object at infinity.

DESCRIPTION OF THE EMBODIMENTS

Figure 25:
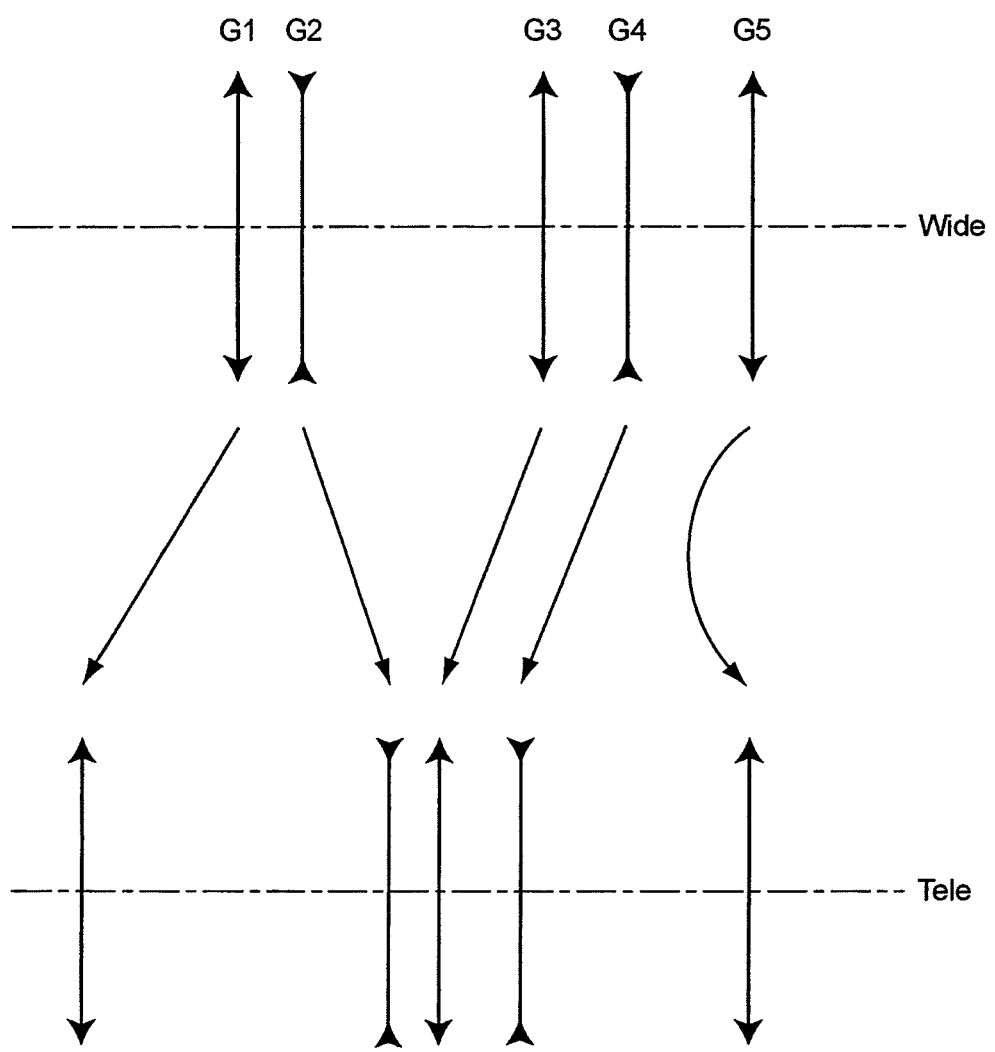
FIG. 25 shows a zoom path of the zoom lens system according to the present invention.

In each of the first through sixth numerical embodiments, the zoom lens system according to the present invention is configured of a positive first lens group G1, a negative second lens group G2, a positive third lens group G3, a negative fourth lens group G4, and a positive fifth lens group G5, in that order from the object side, as shown in the zoom path of FIG. 25.

In each of the first through sixth numerical embodiments, the zoom lens system according to the present invention, upon zooming from the short focal length extremity (WIDE) to the long focal length extremity (TELE), moves each of the first through fifth lens groups G1 through G5 in the optical axis direction while increasing the distance between the first lens group G1 and the second lens group G2, decreasing the distance between the second lens group G2 and the third lens group G3, decreasing the distance between the third lens group G3 and the fourth lens group G4, and increasing the distance between the fourth lens group G4 and the fifth lens group G5. However, an arrangement is possible in which, upon zooming from the short focal length extremity to the long focal length extremity, the distance between the third lens group G3 and the fourth lens group G4 increases or almost does not change, or the distance between the fourth lens group G4 and the fifth lens group G5 decreases or almost does not change.

More specifically, upon zooming from the short focal length extremity to the long focal length extremity, the first lens group G1 moves monotonically toward the object side, the second lens group G2 moves monotonically toward the image side, the third lens group G3 moves monotonically toward the object side, the fourth lens group G4 moves monotonically toward the object side, and the fifth lens group G5 first moves toward the object side and thereafter moves back (U-turns) toward the image side until a position that is closer to the object side than when the fifth lens group G5 is positioned at the short focal length extremity (so that the fifth lens group G5 moves toward the object side overall). However, there is a certain amount of freedom allowed in the zoom paths of the first through fifth lens groups G1 through G5.

In each of the first through sixth numerical embodiments, the first lens group G1 is configured of a cemented lens including a negative lens element 11 and a positive lens element 12; and a positive lens element 13, in that order from the object side.

In each of the first through fourth numerical embodiments, the second lens group G2 is configured of a negative lens element (negative lens element having a concave surface on the image side) 21, a positive lens element 22, a negative lens element 23, and a positive lens element 24, in that order from the object side. An aspherical surface is formed on each side of the negative lens element 21.

In the fifth numerical embodiment, the second lens group G2 is configured of a negative lens element (negative lens element having a concave surface on the image side) 21', a negative lens element 22', and a positive lens element 23', in that order from the object side. An aspherical surface is formed on each side of the negative lens element 22'.

In the six numerical embodiment, the second lens group G2 is configured of a negative lens element (negative lens element having a concave surface on the image side) 21", a negative lens element 22", and a cemented lens formed from a negative lens element 23" and a positive lens element 24", in that order from the object side. An aspherical surface is formed on each side of the negative lens element 22".

In each of the first through sixth numerical embodiments, the third lens group G3 is configured of a positive lens element 31, a cemented lens formed by a positive lens element 32 and a negative lens element 33; and a positive lens element 34, in that order from the object side. In the first through sixth numerical embodiments, an aspherical surface is formed on each side of the positive lens element 31. In the first through fifth numerical embodiments, a spherical surface is formed on each side of the positive lens element 34. In the sixth numerical embodiment, an aspherical surface is formed on each side of the positive lens element 34.

In each of the first through fourth and sixth numerical embodiments, the fourth lens group G4 is configured of a negative single lens element 41. In the first, second, fourth and sixth numerical embodiments, the negative single lens element 41 has an aspherical surface formed on each side thereof. In the third numerical embodiment, the negative single lens element 41 has a spherical surface on each side.

In the fifth numerical embodiment, the fourth lens group G4 is configured of a negative lens element 41' and a positive lens element 42', in that order from the object side. The positive lens element 42' is provided with an aspherical surface on each side thereof.

In the first through sixth numerical embodiments, the fifth lens group G5 is a positive single lens element 51 having an aspherical surface formed on each side thereof.

In the zoom lens system according to the present invention, which is configured of a positive first lens group G1, a negative second lens group G2, a positive third lens group G3, a negative fourth lens group G4, and a positive fifth lens group G5, in that order from the object side, a high zoom ratio of 25:1 through 30:1 and miniaturization (reduction in the overall length of the zoom lens system), in which the telephoto ratio is approximately 0.7, has been successfully achieved, by optimally setting the focal length of the first lens group G1 and the zoom burden on the second lens group G2.

Condition (1) specifies the ratio of the focal length of the first lens group G1 to the focal length of the entire zoom lens system at the long focal length extremity. By satisfying condition (1), the overall length of the zoom lens system can be reduced, especially at the long focal length extremity, and chromatic aberration can be favorably corrected so that a superior optical quality can be achieved.

If the upper limit of condition (1) is exceeded, since the optical power of the first lens group G1 becomes too weak, the overall length of the zoom lens system becomes increasingly large at the long focal length extremity.

If the lower limit of condition (1) is exceeded, since the optical power of the first lens group G1 becomes too strong, chromatic aberration in particular becomes difficult to correct, so that the optical quality deteriorates.

Condition (2) specifies the change in the lateral magnification of the second lens group G2 when zooming from the short focal length extremity to the long focal length extremity, i.e., condition (2) specifies the zoom burden on the second lens group G2. By satisfying condition (2), a high zoom ratio can be achieved while coma, etc., can be favorably corrected, so that a superior optical quality can be achieved.

If the upper limit of condition (2) is exceeded, since the zoom burden on the second lens group G2 becomes too great, it becomes difficult to correct coma in particular, so that the optical quality deteriorates.

If the lower limit of condition (2) is exceeded, since the zoom burden on the second lens group G2 becomes too small, a high zoom ratio cannot be achieved.

In the zoom lens system of each of the first through fourth numerical embodiments, the second lens group G2 is configured of four lens elements, i.e., a negative lens element 21 having a concave surface on the image side, a positive lens element 22, a negative lens element 23, and a positive lens element 24, in that order from the object side.

Condition (3) specifies, with respect to the above-described configuration (of the first through fourth numerical embodiments), the average value of the Abbe numbers with respect to the d-line of the positive lens elements 22 and 24, of the second lens group G2. By satisfying condition (3), lateral chromatic aberration can be favorably corrected so that a superior optical quality can be achieved.

If the upper limit of condition (3) is exceeded, correction of lateral chromatic aberration becomes insufficient, so that the optical quality deteriorates.

If the lower limit of condition (3) is exceeded, correction of lateral chromatic aberration becomes excessive, so that the optical quality deteriorates.

In the zoom lens system of the fifth numerical embodiment, the second lens group G2 is configured of three lens elements, i.e., a negative lens element 21' having a concave surface on the image side, a negative lens element 22', and a positive lens element 23', in that order from the object side.

Condition (3') specifies, with respect to the above-described configuration (of the fifth numerical embodiment), the Abbe number with respect to the d-line of the positive lens element 23' of the second lens group G2. By satisfying condition (3'), lateral chromatic aberration can be favorably corrected, so that a superior optical quality can be achieved.

If the upper limit of condition (3') is exceeded, correction of lateral chromatic aberration becomes insufficient, so that the optical quality deteriorates.

If the lower limit of condition (3') is exceeded, correction of lateral chromatic aberration becomes excessive, so that the optical quality deteriorates.

In the zoom lens system of the sixth numerical embodiment, the second lens group G2 is configured of four lens elements, i.e., a negative lens element 21" having a concave surface on the image side, a negative lens element 22", and a cemented lens configured of a negative lens element 23" and a positive lens element 24", in that order from the object side.

Condition (3") specifies, with respect to the above-described configuration (of the sixth numerical embodiment), the Abbe number with respect to the d-line of the positive lens element 24" of the second lens group G2. By satisfying condition (3"), lateral chromatic aberration can be favorably corrected, so that a superior optical quality can be achieved.

If the upper limit of condition (3") is exceeded, correction of lateral chromatic aberration becomes insufficient, so that the optical quality deteriorates.

If the lower limit of condition (3") is exceeded, correction of lateral chromatic aberration becomes excessive, so that the optical quality deteriorates.

In the zoom lens system of the illustrated embodiments, the first lens group G1 is configured of a negative lens element 11, a positive lens element 12, and a positive lens element 13, in that order from the object side. Furthermore, by cementing the negative lens element 11 and the positive lens element 12 to each other, aberrations caused by positional errors of each of the negative lens element 11 and the positive lens element 12 can be suppressed, and deterioration in optical quality occurring during the process of manufacture can be prevented.

Condition (4), with respect to the above-described configuration of the first lens group G1, shows the average value of the Abbe numbers with respect to the d-line of the positive lens elements 12 and 13, respectively, within the first lens group G1. By satisfying condition (4), axial chromatic aberrations can be favorably corrected, so that a superior optical quality can be achieved.

If the lower limit of condition (4) is exceeded, correction of axial chromatic aberration becomes insufficient, so that the optical quality deteriorates.

Conditions (5) and (5'), with respect to the above-described configuration of the first lens group G1, specifies the Abbe number with respect to the d-line of the negative lens element 11 provided within the first lens group G1. By satisfying condition (5), axial chromatic aberration can be favorably corrected, so that a superior optical quality can be achieved. If condition (5') is satisfied, an even more superior optical quality can be achieved.

If the upper limit of condition (5) or (5') is exceeded, correction of axial chromatic aberration becomes insufficient, so that the optical quality deteriorates.

If the lower limit of condition (5) is exceeded, correction of axial chromatic aberration becomes excessive, so that the optical quality deteriorates.

Condition (6) specifies the change in the lateral magnification of the fourth lens group G4 from an intermediate focal length fm (fm=$(fw*ft)^{1/2}$, wherein fw designates the focal length of the entire zoom lens system at the short focal length extremity, and ft designates the focal length of the entire zoom lens system at the long focal length extremity) to the long focal length extremity. By satisfying condition (6), coma and lateral chromatic aberration can be favorably corrected so that a superior optical quality can be achieved, and the change in distance between the third lens group G3 and the fourth lens group G4 during zooming can be reduced so that the mechanical arrangement thereof can be miniaturized and simplified.

If the upper limit of condition (6) is exceeded, correction of coma and lateral chromatic aberration becomes difficult, so that the optical quality deteriorates.

If the lower limit of condition (6) is exceeded, the change in distance between the third lens group G3 and the fourth lens group G4 during zooming increases, thereby enlarging and complicating the mechanical arrangement thereof.

Conditions (7) and (8) specify the change in distance between the second lens group G2 and the third lens group G3 during zooming. By satisfying conditions (7) and (8), the change in distance between the second lens group G2 and the third lens group G3 during zooming can be reduced, so that the overall length of the zoom lens system can be reduced (especially the fully-retracted length of the zoom lens system), while coma and lateral chromatic aberration can be favorably corrected, thereby achieving a superior optical quality.

If the upper limit of condition (7) is exceeded or the lower limit of condition (8) is exceeded, correction of coma and lateral chromatic aberration become insufficient, so that the optical quality deteriorates.

If the lower limit of condition (7) is exceeded or the upper limit of condition (8) is exceeded, the change in distance between the second lens group G2 and the third lens group G3 during zooming increases, so that the overall length of the zoom lens system increases (especially the fully-retracted length of the zoom lens system).

In the illustrated numerical embodiments, the third lens group G3 is configured of a positive lens element 31, a cemented lens configured of a positive lens element 32 and a negative lens element 33; and a positive lens element 34, in that order from the object side.

Condition (9) specifies, with respect to the above-described configuration of the third lens group G3, the average value of the Abbe numbers with respect to the d-line of the positive lens elements 31, 32 and 34 within the third lens group G3. By satisfying condition (9), field curvature can be favorably corrected and a superior quality can be achieved.

If the upper limit of condition (9) is exceeded, the field curvature becomes overcorrected, so that the optical quality deteriorates.

If the lower limit of condition (9) is exceeded, correction of the field curvature becomes insufficient, so that the optical quality deteriorates.

In a focusing arrangement in which, for example, focusing is carried out by only one of the fourth lens group G4 or the fifth lens group G5, it is extremely difficult to achieve a favorable optical quality during focusing on an object at infinity through to an object at a close distance throughout the entire zooming range, from the short focal length extremity to the long focal length extremity; nevertheless, if attempts are made to achieve favorable optical quality in such an arrangement, an increase in the overall length of the zoom lens system cannot be avoided. Furthermore, the focusing movement amount that is required by a focusing lens group differs according to the zooming range, and in the zooming range at which the lens groups closely approach each other during zooming at the long focal length extremity or at the short focal length extremity, a large focusing movement amount hinders the miniaturization (reduction in overall length) of the zoom lens system.

To solve this problem, in the zoom lens system of the present invention, the focusing lens group is arranged such that, when focusing on an object at infinity to an object at a finite distance, both the fourth lens group G4 and the fifth lens group G5 serve as the focusing lens group in at least part of the zooming range, thereby achieving a favorable optical quality at a close distance throughout the entire zooming range and successfully achieving miniaturization (reduction in the overall length) of the zoom lens system. Furthermore, as shown in the first through fourth and sixth numerical embodiments, by configuring the fourth lens group G4 and the fifth lens group G5, which serve as the focusing lens group, of the negative single lens element 41 and the positive single lens element 51, respectively, the burden on the focusing drive mechanism can be reduced, so that a rapid focusing operation can be achieved.

Specific numerical embodiments will be herein discussed. In the aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

FIGS. 1 through 4D and Tables 1 through 4 show a first numerical embodiment of a zoom lens system according to the present invention. FIG. 1 shows a lens arrangement of the first numerical embodiment of the zoom lens system at the short focal length extremity when focused on an object at infinity. FIGS. 2A, 2B, 2C and 2D show various aberrations that occurred in the lens arrangement shown in FIG. 1 at the short focal length extremity when focused on an object at infinity. FIGS. 3A, 3B, 3C and 3D show various aberrations that occurred in the lens arrangement shown in FIG. 1 at an intermediate focal length when focused on an object at infinity. FIGS. 4A, 4B, 4C and 4D show various aberrations that occurred in the lens arrangement shown in FIG. 1 at the long focal length extremity when focused on an object at infinity. Table 1 shows the lens surface data, Table 2 shows various zoom lens system data, Table 3 shows the aspherical surface data, and Table 4 shows the lens group data of the zoom lens system according to the first numerical embodiment.

The zoom lens system of the first numerical embodiment is configured of a positive first lens group G1, a negative second lens group G2, a positive third lens group G3, a negative fourth lens group G4 and a positive fifth lens group G5, in that order from the object side. A diaphragm S which is provided between the second lens group G2 and the third lens group G3 moves integrally with the third lens group G3 during zooming. An optical filter OP is disposed behind the fifth lens group G5 (between the fifth lens group G5 and the imaging plane I).

The first lens group G1 is configured of a negative meniscus lens element 11 having a convex surface on the object side, a biconvex positive lens element 12 and a positive meniscus lens element 13 having a convex surface on the object side, in that order from the object side. The negative meniscus lens element 11 and the biconvex positive lens element 12 are bonded to each other to constitute a cemented lens.

The second lens group G2 is configured of a biconcave negative lens element 21, a biconvex positive lens element 22, a biconcave negative lens element 23, and a positive meniscus lens element 24 having a convex surface on the object side, in that order from the object side. The biconcave negative lens element 21 is provided with an aspherical surface on each side thereof.

The third lens group G3 is configured of a biconvex positive lens element 31, a biconvex positive lens element 32, a biconcave negative lens element 33, and a biconvex positive lens element 34, in that order from the object side. The biconvex positive lens element 31 is provided with an aspherical surface on each side thereof. The biconvex positive lens element 32 and the biconcave negative lens element 33 are bonded to each other to constitute a cemented lens.

The fourth lens group G4 is configured of a biconcave negative single lens element 41 having an aspherical surface on each side thereof.

The fifth lens group G5 is configured of a positive meniscus single lens element 51 having a convex surface on the object side. The positive meniscus single lens element is provided with an aspherical surface on each side thereof.

TABLE 1

SURFACE DATA

| Surf. No. | r | d | N(d) | νd |
|---|---|---|---|---|
| 1 | 54.191 | 1.100 | 1.83400 | 37.3 |
| 2 | 25.314 | 4.360 | 1.43700 | 95.1 |
| 3 | −201.636 | 0.100 | | |
| 4 | 24.998 | 3.150 | 1.59282 | 68.6 |

TABLE 1-continued

SURFACE DATA

| Surf. No. | r | d | N(d) | νd |
|---|---|---|---|---|
| 5 | 221.867 | d5 | | |
| 6* | −97.487 | 0.700 | 1.76802 | 49.2 |
| 7* | 6.175 | 2.520 | | |
| 8 | 120.000 | 1.110 | 1.80518 | 25.5 |
| 9 | −37.780 | 0.890 | | |
| 10 | −10.701 | 0.600 | 1.77250 | 49.6 |
| 11 | 16.905 | 0.050 | | |
| 12 | 12.601 | 1.660 | 1.92286 | 20.9 |
| 13 | 106.459 | d13 | | |
| 14 (Diaphragm) | ∞ | 0.000 | | |
| 15* | 6.970 | 3.100 | 1.62041 | 60.3 |
| 16* | −15.974 | 0.100 | | |
| 17 | 23.731 | 2.000 | 1.59349 | 67.0 |
| 18 | −7.480 | 0.500 | 1.88300 | 40.8 |
| 19 | 5.742 | 0.480 | | |
| 20 | 7.585 | 2.110 | 1.48749 | 70.4 |
| 21 | −7.585 | d21 | | |
| 22* | −14.589 | 1.350 | 1.49710 | 81.6 |
| 23* | 24.410 | d23 | | |
| 24* | 13.500 | 1.900 | 1.54358 | 55.7 |
| 25* | 71.516 | d25 | | |
| 26 | ∞ | 0.800 | 1.51680 | 64.2 |
| 27 | ∞ | — | | |

The asterisk (*) designates an aspherical surface which is rotationally symmetrical with respect to the optical axis.

TABLE 2

ZOOM LENS SYSTEM DATA
Zoom Ratio: 29.50

| | Short Focal Length Extremity | Intermediate Focal Length | Long Focal Length Extremity |
|---|---|---|---|
| FNO. | 3.5 | 5.4 | 6.3 |
| f | 4.55 | 24.71 | 134.21 |
| W | 40.5 | 9.0 | 1.7 |
| Y | 3.66 | 3.85 | 3.85 |
| fB | 1.13 | 1.13 | 1.13 |
| L | 59.67 | 75.44 | 87.00 |
| d5 | 0.500 | 18.747 | 31.170 |
| d13 | 20.406 | 7.298 | 0.600 |
| d21 | 3.420 | 4.868 | 2.220 |
| d23 | 2.632 | 4.525 | 17.349 |
| d25 | 3.000 | 10.294 | 5.951 |

TABLE 3

Aspherical Surface Data (the aspherical surface coefficients not indicated are zero (0.00)):

| Surf. No. | K | A4 | A6 | A8 | A10 |
|---|---|---|---|---|---|
| 6 | 0.000 | 0.3392E−03 | −0.3614E−05 | 0.7695E−08 | |
| 7 | 0.000 | 0.2671E−03 | 0.6951E−05 | 0.4191E−06 | |
| 15 | −1.000 | −0.1010E−03 | −0.7181E−05 | −0.7905E−07 | −0.9870E−07 |
| 16 | 0.000 | −0.7388E−04 | −0.2511E−05 | −0.2285E−05 | |
| 22 | 0.000 | 0.3893E−03 | 0.1268E−03 | −0.1232E−04 | 0.4136E−06 |
| 23 | 0.000 | 0.4992E−03 | 0.7303E−04 | −0.4028E−05 | |
| 24 | 0.000 | −0.3981E−03 | −0.9094E−05 | −0.2257E−06 | −0.1793E−07 |
| 25 | 0.000 | −0.5597E−03 | −0.8508E−05 | −0.5520E−06 | |

TABLE 4

LENS GROUP DATA

| Lens Group | 1st Surf | Focal Length |
|---|---|---|
| 1 | 1 | 43.50 |
| 2 | 6 | −5.80 |
| 3 | 15 | 10.58 |
| 4 | 22 | −18.16 |
| 5 | 24 | 30.27 |

Numerical Embodiment 2

FIGS. 5 through 8D and Tables 5 through 8 show a second numerical embodiment of a zoom lens system according to the present invention. FIG. 5 shows a lens arrangement of the second numerical embodiment of the zoom lens system at the short focal length extremity when focused on an object at infinity. FIGS. 6A, 6B, 6C and 6D show various aberrations that occurred in the lens arrangement shown in FIG. 5 at the short focal length extremity when focused on an object at infinity. FIGS. 7A, 7B, 7C and 7D show various aberrations that occurred in the lens arrangement shown in FIG. 5 at an intermediate focal length when focused on an object at infinity. FIGS. 8A, 8B, 8C and 8D show various aberrations that occurred in the lens arrangement shown in FIG. 5 at the long focal length extremity when focused on an object at infinity. Table 5 shows the lens surface data, Table 6 shows various zoom lens system data, Table 7 shows the aspherical surface data, and Table 8 shows the lens group data of the zoom lens system according to the second numerical embodiment.

The lens arrangement of the second numerical embodiment is the same as that of the first numerical embodiment except for the following aspects:

(1) The negative lens element 21 of the second lens group G2 is a negative meniscus lens element having a convex surface on the object side.

(2) The positive lens element 22 of the second lens group G2 is a positive meniscus lens element having a convex surface on the object side.

TABLE 5

SURFACE DATA

| Surf. No. | r | d | N(d) | νd |
|---|---|---|---|---|
| 1 | 52.022 | 1.200 | 1.83400 | 37.3 |
| 2 | 26.690 | 3.870 | 1.43700 | 95.1 |
| 3 | −815.000 | 0.100 | | |
| 4 | 26.245 | 2.870 | 1.59282 | 68.6 |
| 5 | 141.051 | d5 | | |
| 6* | 277.755 | 0.700 | 1.76802 | 49.2 |
| 7* | 6.109 | 2.290 | | |
| 8 | 23.476 | 1.110 | 1.83400 | 37.3 |
| 9 | 77.531 | 1.280 | | |
| 10 | −11.291 | 0.600 | 1.72916 | 54.7 |
| 11 | 18.397 | 0.100 | | |
| 12 | 14.180 | 1.600 | 1.92286 | 20.9 |
| 13 | 214.655 | d13 | | |
| 14 (Diaphragm) | ∞ | 0.000 | | |
| 15* | 6.882 | 3.000 | 1.58913 | 61.2 |
| 16* | −16.690 | 0.100 | | |
| 17 | 18.144 | 1.770 | 1.61800 | 63.4 |
| 18 | −7.560 | 0.500 | 1.88300 | 40.8 |
| 19 | 5.941 | 0.540 | | |
| 20 | 8.192 | 2.000 | 1.48749 | 70.4 |
| 21 | −8.192 | d21 | | |
| 22* | −16.371 | 0.750 | 1.49710 | 81.6 |
| 23* | 20.810 | d23 | | |
| 24* | 11.500 | 1.900 | 1.54358 | 55.7 |
| 25* | 38.151 | d25 | | |
| 26 | ∞ | 0.800 | 1.51680 | 64.2 |
| 27 | ∞ | — | | |

The asterisk (*) designates an aspherical surface which is rotationally symmetrical with respect to the optical axis.

TABLE 6

ZOOM LENS SYSTEM DATA
Zoom Ratio: 25.70

| | Short Focal Length Extremity | Intermediate Focal Length | Long Focal Length Extremity |
|---|---|---|---|
| FNO. | 3.4 | 5.1 | 6.2 |
| f | 4.60 | 23.32 | 118.21 |
| W | 40.1 | 9.6 | 2.0 |
| Y | 3.66 | 3.85 | 3.85 |
| fB | 1.13 | 1.13 | 1.13 |
| L | 59.31 | 73.46 | 89.00 |
| d5 | 0.500 | 20.183 | 34.769 |
| d13 | 21.477 | 6.898 | 0.550 |
| d21 | 3.652 | 5.707 | 3.380 |
| d23 | 2.971 | 4.318 | 16.324 |
| d25 | 2.500 | 8.142 | 5.767 |

TABLE 7

Aspherical Surface Data (the aspherical surface coefficients not indicated are zero (0.00)):

| Surf. No. | K | A4 | A6 | A8 | A10 |
|---|---|---|---|---|---|
| 6 | 0.000 | 0.1964E−03 | −0.8192E−06 | −0.7889E−08 | |
| 7 | 0.000 | 0.9621E−04 | 0.4721E−05 | 0.1088E−06 | 0.5578E−08 |
| 15 | −1.000 | −0.6951E−04 | −0.9894E−05 | −0.2533E−06 | −0.7626E−07 |
| 16 | 0.000 | −0.6760E−04 | −0.1161E−04 | −0.1752E−05 | |
| 22 | 0.000 | 0.3497E−03 | 0.1071E−03 | −0.8486E−05 | 0.1665E−06 |
| 23 | 0.000 | 0.3250E−03 | 0.8845E−04 | −0.5074E−05 | |
| 24 | 0.000 | −0.5012E−03 | −0.2570E−05 | −0.3980E−06 | −0.7153E−08 |
| 25 | 0.000 | −0.5890E−03 | −0.9475E−05 | −0.3322E−06 | |

TABLE 8

LENS GROUP DATA

| Lens Group | 1st Surf. | Focal Length |
|---|---|---|
| 1 | 1 | 49.63 |
| 2 | 6 | -6.58 |
| 3 | 15 | 10.59 |
| 4 | 22 | -18.31 |
| 5 | 24 | 29.54 |

Numerical Embodiment 3

Figure 9:
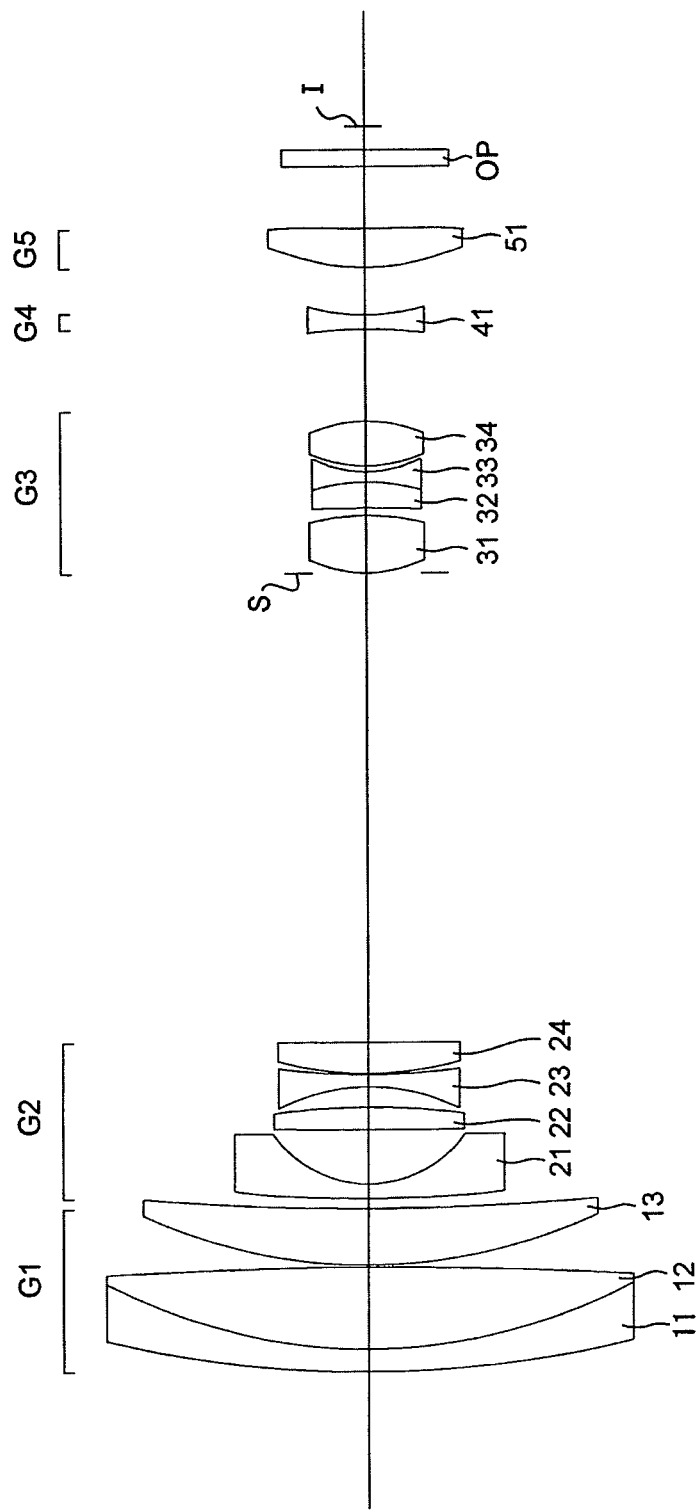
FIG. 9 shows a lens arrangement of a third numerical embodiment of a zoom lens system, according to the present invention, at the short focal length extremity when focused on an object at infinity.

FIGS. 9 through 12D and Tables 9 through 12 show a third numerical embodiment of a zoom lens system according to the present invention. FIG. 9 shows a lens arrangement of the third numerical embodiment of the zoom lens system at the short focal length extremity when focused on an object at infinity. FIGS. 10A, 10B, 10C and 10D show various aberrations that occurred in the lens arrangement shown in FIG. 9 at the short focal length extremity when focused on an object at infinity. FIGS. 11A, 11B, 11C and 11D show various aberrations that occurred in the lens arrangement shown in FIG. 9 at an intermediate focal length when focused on an object at infinity. FIGS. 12A, 12B, 12C and 12D show various aberrations that occurred in the lens arrangement shown in FIG. 9 at the long focal length extremity when focused on an object at infinity. Table 9 shows the lens surface data, Table 10 shows various zoom lens system data, Table 11 shows the aspherical surface data, and Table 12 shows the lens group data of the zoom lens system according to the third numerical embodiment.

The lens arrangement of the third numerical embodiment is the same as that of the first numerical embodiment except for the following aspects:

(1) The negative lens element 21 of the second lens group G2 is a negative meniscus lens element having a convex surface on the object side.

(2) The positive lens element 32 of third lens group G3 is a positive meniscus lens element having a convex surface on the image side.

(3) The biconcave negative single lens element 41 of the fourth lens group G4 has a spherical surface on each side thereof (rather than an aspherical surface).

TABLE 9

SURFACE DATA

| Surf. No. | r | d | N(d) | νd |
|---|---|---|---|---|
| 1 | 57.168 | 1.100 | 1.83400 | 37.3 |
| 2 | 28.280 | 3.960 | 1.43700 | 95.1 |
| 3 | -222.809 | 0.100 | | |
| 4 | 27.005 | 2.760 | 1.59282 | 68.6 |
| 5 | 132.315 | d5 | | |
| 6* | 77.038 | 0.700 | 1.76802 | 49.2 |
| 7* | 5.714 | 2.620 | | |
| 8 | 198.755 | 1.120 | 1.80518 | 25.5 |
| 9 | -35.245 | 0.990 | | |
| 10 | -10.046 | 0.600 | 1.77250 | 49.6 |
| 11 | 36.128 | 0.050 | | |
| 12 | 17.171 | 1.510 | 1.92286 | 20.9 |
| 13 | 1027.000 | d13 | | |
| 14 (Diaphragm) | ∞ | 0.000 | | |
| 15* | 6.208 | 2.810 | 1.58913 | 61.2 |
| 16* | -11.970 | 0.370 | | |
| 17 | -65.523 | 1.280 | 1.59349 | 67.0 |
| 18 | -9.468 | 0.500 | 1.88300 | 40.8 |
| 19 | 5.750 | 0.300 | | |
| 20 | 7.139 | 2.170 | 1.48749 | 70.4 |
| 21 | -7.139 | d21 | | |
| 22 | -22.688 | 0.700 | 1.48749 | 70.4 |
| 23 | 10.732 | d23 | | |
| 24* | 11.062 | 1.890 | 1.54358 | 55.7 |
| 25* | 83.344 | d25 | | |
| 26 | ∞ | 0.800 | 1.51680 | 64.2 |
| 27 | ∞ | — | | |

The asterisk (*) designates an aspherical surface which is rotationally symmetrical with respect to the optical axis.

TABLE 10

ZOOM LENS SYSTEM DATA
Zoom Ratio: 28.40

| | Short Focal Length Extremity | Intermediate Focal Length | Long Focal Length Extremity |
|---|---|---|---|
| FNO. | 3.5 | 5.4 | 5.7 |
| f | 4.55 | 24.25 | 129.26 |
| W | 40.3 | 9.2 | 1.8 |
| Y | 3.66 | 3.85 | 3.85 |
| fB | 1.13 | 1.13 | 1.13 |
| L | 60.76 | 76.10 | 85.91 |
| d5 | 0.500 | 20.882 | 37.151 |
| d13 | 23.022 | 7.679 | 0.510 |
| d21 | 4.478 | 6.615 | 2.190 |
| d23 | 2.300 | 3.997 | 12.493 |
| d25 | 3.000 | 9.971 | 6.109 |

TABLE 11

Aspherical Surface Data (the aspherical surface coefficients not indicated are zero (0.00)):

| Surf. No. | K | A4 | A6 | A8 | A10 |
|---|---|---|---|---|---|
| 6 | 0.000 | -0.5061E-04 | 0.3184E-05 | -0.3044E-07 | |
| 7 | 0.000 | -0.2665E-03 | -0.1987E-05 | 0.9815E-07 | |
| 15 | -1.000 | -0.4633E-04 | -0.5047E-05 | -0.3654E-06 | -0.2132E-06 |
| 16 | 0.000 | 0.2465E-03 | -0.1666E-05 | -0.4308E-05 | |
| 24 | 0.000 | -0.1920E-03 | 0.7269E-05 | -0.3978E-06 | |
| 25 | 0.000 | -0.2953E-03 | 0.4467E-05 | -0.3315E-06 | |

TABLE 12

LENS GROUP DATA

| Lens Group | 1st Surf. | Focal Length |
|---|---|---|
| 1 | 1 | 49.79 |
| 2 | 6 | −6.61 |
| 3 | 15 | 10.94 |
| 4 | 22 | −14.84 |
| 5 | 24 | 23.25 |

Numerical Embodiment 4

Figure 13:
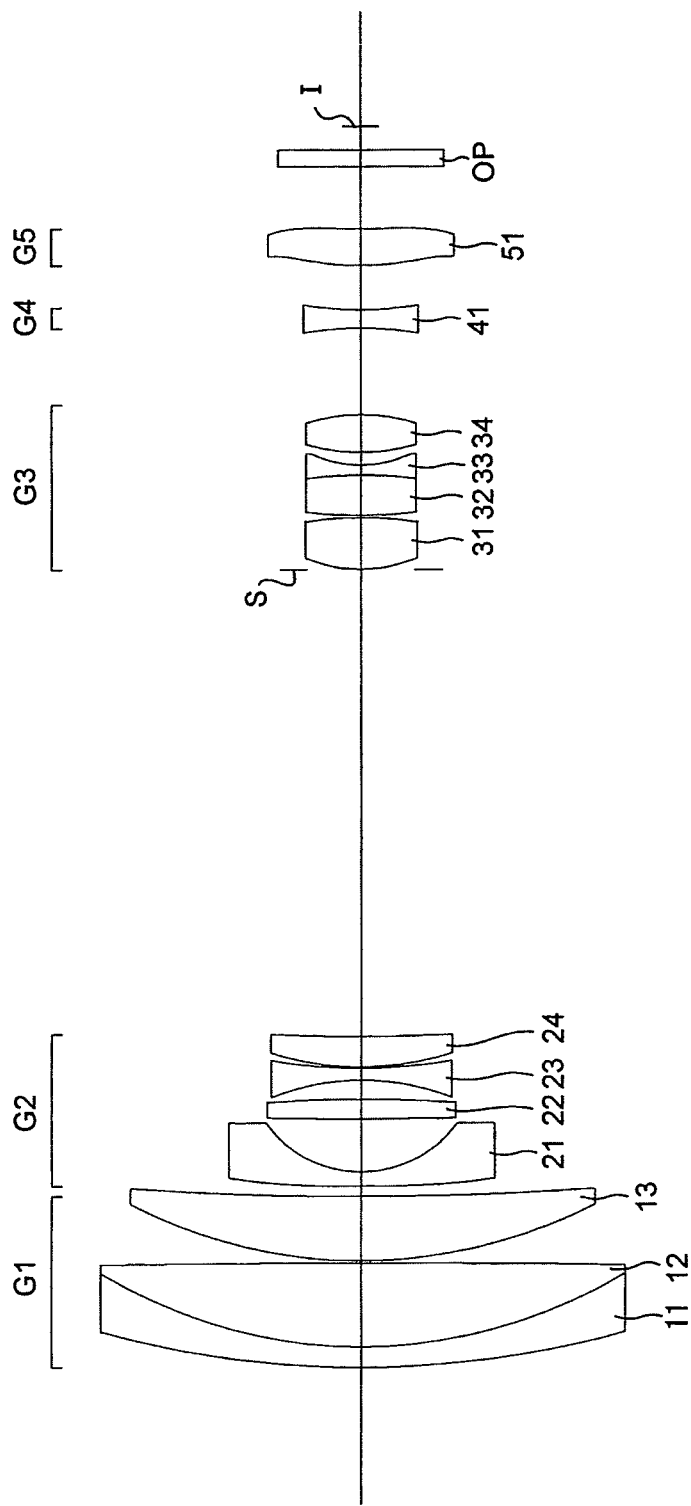
FIG. 13 shows a lens arrangement of a fourth numerical embodiment of a zoom lens system, according to the present invention, at the short focal length extremity when focused on an object at infinity.

FIGS. 13 through 16D and Tables 13 through 16 show a fourth numerical embodiment of a zoom lens system according to the present invention. FIG. 13 shows a lens arrangement of the fourth numerical embodiment of the zoom lens system at the short focal length extremity when focused on an object at infinity. FIGS. 14A, 14B, 14C and 14D show various aberrations that occurred in the lens arrangement shown in FIG. 13 at the short focal length extremity when focused on an object at infinity. FIGS. 15A, 15B, 15C and 15D show various aberrations that occurred in the lens arrangement shown in FIG. 13 at an intermediate focal length when focused on an object at infinity. FIGS. 16A, 16B, 16C and 16D show various aberrations that occurred in the lens arrangement shown in FIG. 13 at the long focal length extremity when focused on an object at infinity. Table 13 shows the lens surface data, Table 14 shows various zoom lens system data, Table 15 shows the aspherical surface data, and Table 16 shows the lens group data of the zoom lens system according to the fourth numerical embodiment.

The lens arrangement of the fourth numerical embodiment is the same as that of the first numerical embodiment except for the following aspect:

(1) The negative lens element 21 of the second lens group G2 is a negative meniscus lens element having a convex surface on the object side.

TABLE 13

SURFACE DATA

| Surf. No. | r | d | N(d) | νd |
|---|---|---|---|---|
| 1 | 49.763 | 1.000 | 1.83400 | 37.3 |
| 2 | 25.447 | 4.070 | 1.43700 | 95.1 |
| 3 | −915.180 | 0.100 | | |
| 4 | 25.647 | 3.115 | 1.59282 | 68.6 |
| 5 | 168.170 | d5 | | |
| 6* | 160.000 | 0.700 | 1.80139 | 45.5 |
| 7* | 6.438 | 2.565 | | |
| 8 | 241.109 | 0.960 | 1.84666 | 23.8 |
| 9 | −68.089 | 0.933 | | |
| 10 | −12.394 | 0.600 | 1.77250 | 49.6 |
| 11 | 27.839 | 0.050 | | |
| 12 | 15.175 | 1.494 | 1.94594 | 18.0 |
| 13 | 99.287 | d13 | | |
| 14(Diaphragm) | ∞ | 0.000 | | |
| 15* | 6.752 | 2.559 | 1.58913 | 61.2 |
| 16* | −18.432 | 0.100 | | |
| 17 | 23.740 | 1.962 | 1.59349 | 67.0 |
| 18 | −23.740 | 0.500 | 1.91082 | 35.2 |
| 19 | 5.980 | 0.618 | | |
| 20 | 10.071 | 1.827 | 1.51680 | 64.2 |
| 21 | −9.336 | d21 | | |
| 22* | −17.157 | 0.900 | 1.49710 | 81.6 |
| 23* | 19.577 | d23 | | |
| 24* | 13.807 | 1.790 | 1.54358 | 55.7 |
| 25* | 87.760 | d25 | | |
| 26 | ∞ | 0.800 | 1.51680 | 64.2 |
| 27 | ∞ | — | | |

The asterisk (*) designates an aspherical surface which is rotationally symmetrical with respect to the optical axis.

TABLE 14

ZOOM LENS SYSTEM DATA
Zoom Ratio: 28.64

| | Short Focal Length Extremity | Intermediate Focal Length | Long Focal Length Extremity |
|---|---|---|---|
| FNO. | 3.5 | 5.4 | 6.3 |
| f | 4.65 | 24.88 | 133.13 |
| W | 39.9 | 9.0 | 1.7 |
| Y | 3.66 | 3.85 | 3.85 |
| fB | 1.13 | 1.13 | 1.13 |
| L | 60.60 | 74.85 | 87.15 |
| d5 | 0.500 | 19.754 | 33.346 |
| d13 | 22.950 | 8.040 | 0.607 |
| d21 | 4.226 | 5.420 | 2.229 |
| d23 | 2.148 | 4.256 | 18.073 |
| d25 | 3.000 | 9.606 | 5.117 |

TABLE 15

Aspherical Surface Data (the aspherical surface coefficients not indicated are zero (0.00)):

| Surf. No. | K | A4 | A6 | A8 | A10 |
|---|---|---|---|---|---|
| 6 | 0.000 | 0.2053E−03 | −0.1724E−05 | −0.2256E−08 | |
| 7 | 0.000 | 0.2196E−03 | 0.4016E−05 | 0.2814E−06 | |
| 15 | −1.000 | −0.2530E−03 | −0.1310E−04 | −0.7718E−06 | −0.1516E−06 |
| 16 | 0.000 | −0.2137E−03 | −0.4987E−05 | −0.3406E−05 | |
| 22 | 0.000 | −0.4112E−03 | 0.1721E−03 | −0.1367E−04 | 0.3495E−06 |
| 23 | 0.000 | −0.3589E−03 | 0.1246E−03 | −0.6374E−05 | |
| 24 | 0.000 | −0.3388E−03 | −0.7076E−05 | −0.2408E−06 | −0.1778E−07 |
| 25 | 0.000 | −0.4836E−03 | −0.5767E−05 | −0.6390E−06 | |

TABLE 16

LENS GROUP DATA

| Lens Group | 1st Surf. | Focal Length |
|---|---|---|
| 1 | 1 | 47.00 |
| 2 | 6 | −6.64 |
| 3 | 15 | 10.94 |
| 4 | 22 | −18.25 |
| 5 | 24 | 29.89 |

Numerical Embodiment 5

FIGS. 17 through 20D and Tables 17 through 20 show a fifth numerical embodiment of a zoom lens system according to the present invention. FIG. 17 shows a lens arrangement of the fifth numerical embodiment of the zoom lens system at the short focal length extremity when focused on an object at infinity. FIGS. 18A, 18B, 18C and 18D show various aberrations that occurred in the lens arrangement shown in FIG. 17 at the short focal length extremity when focused on an object at infinity. FIGS. 19A, 19B, 19C and 19D show various aberrations that occurred in the lens arrangement shown in FIG. 17 at an intermediate focal length when focused on an object at infinity. FIGS. 20A, 20B, 20C and 20D show various aberrations that occurred in the lens arrangement shown in FIG. 17 at the long focal length extremity when focused on an object at infinity. Table 17 shows the lens surface data, Table 18 shows various zoom lens system data, Table 19 shows the aspherical surface data, and Table 20 shows the lens group data of the zoom lens system according to the fifth numerical embodiment.

The lens arrangement of the fifth numerical embodiment is the same as that of the first numerical embodiment except for the following aspects:

(1) The second lens group G2 is configured of a biconcave negative lens element 21', a biconcave negative lens element 22' and a biconvex positive lens element 23', in that order from the object side. The biconcave negative lens element 22' has an aspherical surface on each side thereof.

(2) The fourth lens group G4 is configured of a negative meniscus lens element 41' having a convex surface on the object side, and a positive meniscus lens element 42' having a convex surface on the object side, in that order from the object side. The positive meniscus lens element 42' has an aspherical surface on each side thereof.

TABLE 17

SURFACE DATA

| Surf. No. | r | d | N(d) | νd |
|---|---|---|---|---|
| 1 | 44.127 | 1.400 | 1.91082 | 35.2 |
| 2 | 28.427 | 4.145 | 1.43700 | 95.1 |
| 3 | −295.287 | 0.100 | | |
| 4 | 27.741 | 3.188 | 1.49700 | 81.6 |
| 5 | 167.781 | d5 | | |
| 6 | −347.569 | 1.000 | 1.88300 | 40.8 |
| 7 | 5.631 | 3.223 | | |
| 8* | −20.110 | 0.800 | 1.80139 | 45.5 |
| 9* | 32.428 | 0.100 | | |
| 10 | 21.246 | 1.903 | 1.92286 | 20.9 |
| 11 | −35.676 | d11 | | |
| 12(Diaphragm) | ∞ | 0.000 | | |
| 13* | 6.175 | 3.650 | 1.58913 | 61.2 |
| 14* | −12.377 | 0.100 | | |
| 15 | 37.490 | 2.044 | 1.59282 | 68.6 |
| 16 | −7.898 | 0.500 | 1.88300 | 40.8 |
| 17 | 5.079 | 0.177 | | |
| 18 | 6.063 | 2.296 | 1.43700 | 95.1 |
| 19 | −7.712 | d19 | | |
| 20 | 1117.352 | 0.500 | 1.83481 | 42.7 |
| 21 | 6.747 | 0.100 | | |
| 22* | 8.643 | 1.174 | 1.82115 | 24.1 |
| 23* | 22.452 | d23 | | |
| 24* | 14.700 | 1.285 | 1.54358 | 55.7 |
| 25* | 32.340 | d25 | | |
| 26 | ∞ | 0.800 | 1.51680 | 64.2 |
| 27 | ∞ | — | | |

The asterisk (*) designates an aspherical surface which is rotationally symmetrical with respect to the optical axis.

TABLE 18

ZOOM LENS SYSTEM DATA
Zoom Ratio: 28.64

| | Short Focal Length Extremity | Intermediate Focal Length | Long Focal Length Extremity |
|---|---|---|---|
| FNO. | 3.5 | 5.7 | 6.1 |
| f | 4.40 | 23.54 | 125.97 |
| W | 41.4 | 9.3 | 1.8 |
| Y | 3.66 | 3.85 | 3.85 |
| fB | 1.13 | 1.14 | 1.14 |
| L | 65.77 | 78.37 | 84.51 |
| d5 | 0.500 | 20.222 | 34.728 |
| d11 | 28.127 | 11.144 | 0.500 |
| d19 | 2.216 | 2.092 | 2.000 |
| d23 | 2.308 | 3.822 | 10.658 |
| d25 | 3.000 | 11.465 | 6.997 |

TABLE 19

Aspherical Surface Data (the aspherical surface coefficients not indicated are zero (0.00)):

| Surf. No. | K | A4 | A6 | A8 | A10 |
|---|---|---|---|---|---|
| 8 | 0.000 | −0.4379E−03 | 0.2739E−04 | −0.6431E−06 | |
| 9 | 0.000 | −0.5677E−03 | 0.2330E−04 | −0.6858E−06 | |
| 13 | −1.000 | 0.4327E−05 | −0.6376E−06 | −0.1742E−06 | −0.6569E−07 |
| 14 | 0.000 | 0.2375E−03 | −0.3033E−05 | −0.1840E−05 | |
| 22 | 0.000 | −0.5517E−03 | −0.7009E−05 | 0.4718E−06 | |
| 23 | 0.000 | −0.8000E−03 | −0.4699E−05 | −0.5869E−06 | |
| 24 | 0.000 | −0.9263E−03 | −0.3292E−04 | −0.7583E−06 | −0.1009E−06 |
| 25 | 0.000 | −0.1200E−02 | −0.2441E−04 | −0.2053E−05 | |

TABLE 20

LENS GROUP DATA

| Lens Group | 1st Surf. | Focal Length |
|---|---|---|
| 1 | 1 | 49.15 |
| 2 | 6 | -7.07 |
| 3 | 13 | 10.89 |
| 4 | 20 | -15.52 |
| 5 | 24 | 48.34 |

Numerical Embodiment 6

FIGS. 21 through 24D and Tables 21 through 24 show a sixth numerical embodiment of a zoom lens system according to the present invention. FIG. 21 shows a lens arrangement of the sixth numerical embodiment of the zoom lens system at the short focal length extremity when focused on an object at infinity. FIGS. 22A, 22B, 22C and 22D show various aberrations that occurred in the lens arrangement shown in FIG. 21 at the short focal length extremity when focused on an object at infinity. FIGS. 23A, 23B, 23C and 23D show various aberrations that occurred in the lens arrangement shown in FIG. 21 at an intermediate focal length when focused on an object at infinity. FIGS. 24A, 24B, 24C and 24D show various aberrations that occurred in the lens arrangement shown in FIG. 21 at the long focal length extremity when focused on an object at infinity. Table 21 shows the lens surface data, Table 22 shows various zoom lens system data, Table 23 shows the aspherical surface data, and Table 24 shows the lens group data of the zoom lens system according to the sixth numerical embodiment.

The lens arrangement of the sixth numerical embodiment is the same as that of the first numerical embodiment except for the following aspects:

(1) The positive lens element 12 of the first lens group G1 is a positive meniscus lens element having a convex surface on the object side.

(2) The second lens group G2 is configured of a negative meniscus lens element 21" having a convex surface on the object side, a biconcave negative lens element 22", a negative meniscus lens element 23" having convex surface on the object side, and a positive meniscus lens element 24" having a convex surface on the object side, in that order from the object side. The biconcave negative lens element 22" has an aspherical surface on each surface. The negative meniscus lens element 23" and the positive meniscus lens element 24" are bonded to each other to constitute a cemented lens.

(3) The biconvex positive lens element 34 of the third lens group G3 has an aspherical surface on each side thereof (rather than a spherical surface).

TABLE 21

SURFACE DATA

| Surf. No. | r | d | N(d) | vd |
|---|---|---|---|---|
| 1 | 49.106 | 1.200 | 1.83400 | 37.3 |
| 2 | 25.975 | 3.867 | 1.43700 | 95.1 |
| 3 | 2072.123 | 0.100 | | |
| 4 | 27.591 | 2.923 | 1.59282 | 68.6 |
| 5 | 205.675 | d5 | | |
| 6 | 23.356 | 0.700 | 1.80420 | 46.5 |
| 7 | 5.248 | 3.145 | | |
| 8* | -14.217 | 0.800 | 1.75501 | 51.2 |
| 9* | 17.035 | 0.400 | | |
| 10 | 13.816 | 0.600 | 1.82999 | 45.3 |
| 11 | 10.856 | 1.599 | 1.92286 | 20.9 |
| 12 | 87.793 | d12 | | |
| 13(Diaphragm) | ∞ | 0.000 | | |
| 14* | 6.689 | 2.716 | 1.58313 | 59.5 |
| 15* | -26.365 | 0.100 | | |
| 16 | 10.366 | 1.561 | 1.57146 | 57.7 |
| 17 | -15.782 | 0.500 | 1.91082 | 35.2 |
| 18 | 5.847 | 0.643 | | |
| 19* | 11.048 | 1.591 | 1.58313 | 59.5 |
| 20* | -11.623 | d20 | | |
| 21* | -24.619 | 0.800 | 1.75501 | 51.2 |
| 22* | 23.629 | d22 | | |
| 23* | 11.863 | 2.200 | 1.54358 | 55.7 |
| 24* | 173.559 | d24 | | |
| 25 | ∞ | 0.800 | 1.51680 | 64.2 |
| 26 | ∞ | — | | |

The asterisk (*) designates an aspherical surface which is rotationally symmetrical with respect to the optical axis.

TABLE 22

ZOOM LENS SYSTEM DATA
Zoom Ratio: 28.64

| | Short Focal Length Extremity | Intermediate Focal Length | Long Focal Length Extremity |
|---|---|---|---|
| FNO. | 3.4 | 5.2 | 5.7 |
| f | 4.60 | 24.61 | 131.65 |
| W | 40.2 | 9.0 | 1.7 |
| Y | 3.66 | 3.85 | 3.85 |
| fB | 1.13 | 1.12 | 1.12 |
| L | 58.22 | 74.59 | 88.24 |
| d5 | 0.500 | 21.193 | 36.969 |
| d12 | 20.235 | 6.411 | 0.595 |
| d20 | 2.758 | 6.191 | 2.153 |
| d22 | 2.800 | 3.689 | 14.700 |
| d24 | 4.553 | 9.742 | 6.460 |

TABLE 23

Aspherical Surface Data (the aspherical surface coefficients not indicated are zero (0.00)):

| Surf. No. | K | A4 | A6 | A8 | A10 |
|---|---|---|---|---|---|
| 8 | 0.000 | -0.8226E-03 | -0.4248E-05 | 0.2355E-05 | -0.7956E-07 |
| 9 | 0.000 | -0.7621E-03 | 0.8735E-05 | 0.2040E-05 | -0.7203E-07 |
| 14 | -1.000 | -0.1168E-03 | -0.9074E-05 | 0.4438E-07 | -0.6724E-07 |
| 15 | 0.000 | -0.2755E-03 | 0.3132E-05 | -0.1749E-05 | |
| 19 | 0.000 | 0.2355E-03 | 0.4099E-04 | 0.9986E-06 | |
| 20 | 0.000 | 0.3069E-03 | 0.2513E-04 | 0.2058E-05 | |
| 21 | 0.000 | -0.2564E-03 | 0.1422E-03 | -0.1086E-04 | 0.1806E-06 |
| 22 | 0.000 | -0.1886E-03 | 0.1147E-03 | -0.6573E-05 | |

TABLE 23-continued

Aspherical Surface Data (the aspherical surface coefficients not indicated are zero (0.00)):

| Surf. No. | K | A4 | A6 | A8 | A10 |
|---|---|---|---|---|---|
| 23 | 0.000 | −0.5074E−04 | 0.3754E−05 | −0.7970E−06 | 0.9041E−08 |
| 24 | 0.000 | −0.6235E−04 | 0.1314E−05 | −0.9750E−06 | 0.1582E−07 |

TABLE 24

LENS GROUP DATA

| Lens Group | 1st Surf. | Focal Length |
|---|---|---|
| 1 | 1 | 49.79 |
| 2 | 6 | −6.09 |
| 3 | 14 | 10.29 |
| 4 | 21 | −15.86 |
| 5 | 23 | 23.31 |

The numerical values of each condition for each embodiment are shown in Table 25.

TABLE 25

|  | Embod. 1 | Embod. 2 | Embod. 3 |
|---|---|---|---|
| Cond. (1) | 0.32 | 0.42 | 0.39 |
| Cond. (2) | 11.73 | 8.99 | 16.41 |
| Cond. (3) | 23.17 | 29.11 | 23.17 |
| Cond. (3') | — | — | — |
| Cond. (3") | — | — | — |
| Cond. (4) | 81.87 | 81.87 | 81.87 |
| Cond. (5) | 37.34 | 37.34 | 37.34 |
| Cond. (6) | 1.64 | 1.45 | 1.91 |
| Cond. (7) | −8.64 | −7.91 | −8.34 |
| Cond. (8) | 15.76 | 12.74 | 13.80 |
| Cond. (9) | 1.57 | 1.56 | 1.56 |
|  | Embod. 4 | Embod. 5 | Embod. 6 |
| Cond. (1) | 0.35 | 0.39 | 0.38 |
| Cond. (2) | 11.51 | 10.63 | 14.12 |
| Cond. (3) | 20.88 | — | — |
| Cond. (3') | — | 20.88 | — |
| Cond. (3") | — | — | 20.88 |
| Cond. (4) | 81.87 | 88.36 | 81.87 |
| Cond. (5) | 37.34 | 37.34 | 37.34 |
| Cond. (6) | 1.59 | 1.63 | 1.60 |
| Cond. (7) | −8.51 | −7.33 | −8.88 |
| Cond. (8) | 14.03 | 11.29 | 15.01 |
| Cond. (9) | 1.57 | 1.54 | 1.58 |

As can be understood from the above description and the aberration diagrams, the various aberrations are favorably corrected in each of the first through sixth numerical embodiments.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, a positive third lens group, a negative fourth lens group, and a positive fifth lens group, in that order from the object side, wherein upon zooming from the short focal length extremity to the long focal length extremity, the distance between said first lens group and said second lens group increases, and the distance between said second lens group and said third lens group decreases; and wherein the following conditions (1) and (2) are satisfied:

$$0.30 < f1/ft < 0.43 \quad (1), \text{ and}$$

$$7.0 < M2t/M2w < 17.0 \quad (2), \text{ wherein}$$

f1 designates the focal length of said first lens group, ft designates the focal length of the entire zoom lens system at the long focal length extremity, M2w designates the lateral magnification of said second lens group when focusing on an object at infinity at the short focal length extremity, and M2t designates the lateral magnification of said second lens group when focusing on an object at infinity at the long focal length extremity, and wherein the following conditions (7) and (8) are satisfied:

$$-12.0 < f2/((D23w-D23t)/(ft/fw)) < -7.7 \quad (7), \text{ and}$$

$$12.2 < f3/((D23w-D23t)/(ft/fw)) < 16.0 \quad (8), \text{ wherein}$$

f2 designates the focal length of said second lens group, f3 designates the focal length of said third lens group, D23w designates the air-distance between said second lens group and said third lens group at the short focal length extremity, D23t designates the air-distance between said second lens group and said third lens group at the long focal length extremity, ft designates the focal length of the entire zoom lens system at the long focal length extremity, and fw designates the focal length of the entire zoom lens system at the short focal length extremity.

2. The zoom lens system according to claim 1, wherein said second lens group comprises a negative lens element having a concave surface on the image side, a negative lens element, and a positive lens element, in that order from the object side, and wherein the following condition (3') is satisfied:

$$20 < \nu23' < 35 \quad (3'), \text{ wherein}$$

ν23' designates an Abbe number with respect to the d-line of the positive lens element provided within said second lens group.

3. The zoom lens system according to claim 1, wherein said first lens group comprises a negative lens element, a positive lens element, and a positive lens element, in that order from the object side.

4. The zoom lens system according to claim 3, wherein the following condition (4) is satisfied:

$$(\nu12+\nu13)/2 > 75 \quad (4), \text{ wherein}$$

ν12 designates the Abbe number with respect to the d-line of the positive lens element that is provided on the object side within said first lens group, and ν13 designates the Abbe number with respect to the d-line of the positive lens element that is provided on the image side within said first lens group.

5. The zoom lens system according to claim 3, wherein the following condition (5) is satisfied:

$$30 < v11 < 45 \qquad (5),\text{ wherein}$$

v11 designates the Abbe number with respect to the d-line of the negative lens element provided within said first lens group.

6. The zoom lens system according to claim 3, wherein the negative lens element and the positive lens element on the object side, which are provided within said first lens group, are bonded to each other to form a cemented lens.

7. A zoom lens system comprising a positive first lens group, a negative second lens group, a positive third lens group, a negative fourth lens group, and a positive fifth lens group, in that order from the object side,
wherein upon zooming from the short focal length extremity to the long focal length extremity, the distance between said first lens group and said second lens group increases, and the distance between said second lens group and said third lens group decreases; and
wherein the following conditions (1) and (2) are satisfied:

$$0.30 < f1/ft < 0.43 \qquad (1),\text{ and}$$

$$7.0 < M2t/M2w < 17.0 \qquad (2),\text{ wherein}$$

f1 designates the focal length of said first lens group,
ft designates the focal length of the entire zoom lens system at the long focal length extremity,
M2w designates the lateral magnification of said second lens group when focusing on an object at infinity at the short focal length extremity, and
M2t designates the lateral magnification of said second lens group when focusing on an object at infinity at the long focal length extremity, and
wherein said second lens group comprises a negative lens element having a concave surface on the image side, a positive lens element, a negative lens element, and a positive lens element, in that order from the object side, and
wherein the following condition (3) is satisfied:

$$20 < (v22+v24)/2 < 35 \qquad (3),\text{ wherein}$$

v22 designates the Abbe number with respect to the d-line of the positive lens element that is provided on the object side within said second lens group, and
v24 designates the Abbe number with respect to the d-line of the positive lens element that is provided on the image side within said second lens group.

8. A zoom lens system comprising a positive first lens group, a negative second lens group, a positive third lens group, a negative fourth lens group, and a positive fifth lens group, in that order from the object side,
wherein upon zooming from the short focal length extremity to the long focal length extremity, the distance between said first lens group and said second lens group increases, and the distance between said second lens group and said third lens group decreases; and
wherein the following conditions (1) and (2) are satisfied:

$$0.30 < f1/ft < 0.43 \qquad (1),\text{ and}$$

$$7.0 < M2t/M2w < 17.0 \qquad (2),\text{ wherein}$$

f1 designates the focal length of said first lens group,
ft designates the focal length of the entire zoom lens system at the long focal length extremity,
M2w designates the lateral magnification of said second lens group when focusing on an object at infinity at the short focal length extremity, and
M2t designates the lateral magnification of said second lens group when focusing on an object at infinity at the long focal length extremity, and
wherein said second lens group comprises a negative lens element having a concave surface on the image side, a negative lens element, a negative lens element, and a positive lens element, in that order from the object side, and
wherein the following condition (3″) is satisfied:

$$20 < v24″ < 35 \qquad (3″),\text{ wherein}$$

v24″ designates the Abbe number with respect to the d-line of the positive lens element provided within said second lens group.

9. A zoom lens system comprising a positive first lens group, a negative second lens group, a positive third lens group, a negative fourth lens group, and a positive fifth lens group, in that order from the object side,
wherein upon zooming from the short focal length extremity to the long focal length extremity, the distance between said first lens group and said second lens group increases, and the distance between said second lens group and said third lens group decreases; and
wherein the following conditions (1) and (2) are satisfied:

$$0.30 < f1/ft < 0.43 \qquad (1),\text{ and}$$

$$7.0 < M2t/M2w < 17.0 \qquad (2),\text{ wherein}$$

f1 designates the focal length of said first lens group,
ft designates the focal length of the entire zoom lens system at the long focal length extremity,
M2w designates the lateral magnification of said second lens group when focusing on an object at infinity at the short focal length extremity, and
M2t designates the lateral magnification of said second lens group when focusing on an object at infinity at the long focal length extremity, and
wherein the following condition (6) is satisfied:

$$1.3 < M4m/M4w < 1.8 \qquad (6),\text{ wherein}$$

M4m designates the lateral magnification of said fourth lens group when focusing on an object at infinity at an intermediate focal length fm, wherein fm=(fw*ft)$^{1/2}$, wherein fw designates the focal length of the entire zoom lens system at the short focal length extremity, and ft designates the focal length of the entire zoom lens system at the long focal length extremity, and
M4w designates the lateral magnification of said fourth lens group when focusing on an object at infinity at the short focal length extremity.

10. A zoom lens system comprising a positive first lens group, a negative second lens group, a positive third lens group, a negative fourth lens group, and a positive fifth lens group, in that order from the object side,
wherein upon zooming from the short focal length extremity to the long focal length extremity, the distance between said first lens group and said second lens group increases, and the distance between said second lens group and said third lens group decreases; and
wherein the following conditions (1) and (2) are satisfied:

$$0.30 < f1/ft < 0.43 \qquad (1),\text{ and}$$

$$7.0 < M2t/M2w < 17.0 \qquad (2),\text{ wherein}$$

f1 designates the focal length of said first lens group,
ft designates the focal length of the entire zoom lens system at the long focal length extremity, M2w designates the lateral magnification of said second lens group when focusing on an object at infinity at the short focal length extremity, and M2t designates the lateral magnification of said second lens group when focusing on an object at infinity at the long focal length extremity, and wherein said third lens group comprises a positive lens element, a cemented lens formed by a positive lens element and a negative lens element; and a positive lens element, in that order from the object side, and wherein the following condition (9) is satisfied:

$$1.52 < (n31+n32+n34)/3 < 1.60 \qquad (9), \text{wherein}$$

n31 designates the refractive index at the d-line of the positive lens element provided closest to the object side within said third lens group, n32 designates the refractive index at the d-line of the positive lens element provided second closest to the object side within said third lens group, and n34 designates the refractive index at the d-line of the positive lens element provided closest to the image side within said third lens group.

11. A zoom lens system comprising a positive first lens group, a negative second lens group, a positive third lens group, a negative fourth lens group, and a positive fifth lens group, in that order from the object side, wherein upon zooming from the short focal length extremity to the long focal length extremity, the distance between said first lens group and said second lens group increases, and the distance between said second lens group and said third lens group decreases; and wherein the following conditions (1) and (2) are satisfied:

$$0.30 < f1/ft < 0.43 \qquad (1), \text{and}$$

$$7.0 < M2t/M2w < 17.0 \qquad (2), \text{wherein}$$

f1 designates the focal length of said first lens group, ft designates the focal length of the entire zoom lens system at the long focal length extremity, M2w designates the lateral magnification of said second lens group when focusing on an object at infinity at the short focal length extremity, and M2t designates the lateral magnification of said second lens group when focusing on an object at infinity the long focal length extremity, and wherein said fourth lens group and said fifth lens group both serve as a focusing lens group that is moved in the optical axis direction during a focusing operation in at least one part of the zooming range of said zoom lens system.

12. The zoom lens system according to claim 11, wherein said fourth lens group comprises a negative single lens element.

13. The zoom lens system according to claim 11, wherein said fourth lens group comprises a negative lens element and a positive lens element, in that order from the object side.

14. The zoom lens system according to claim 11, wherein said fifth lens group comprises a positive single lens element.

* * * * *